United States Patent
Chung et al.

(10) Patent No.: US 9,497,775 B2
(45) Date of Patent: Nov. 15, 2016

(54) METHOD AND APPARATUS FOR CARRIER SCHEDULING IN A MULTI-CARRIER SYSTEM

(75) Inventors: Jae Hoon Chung, Gyeongki-do (KR); Seung Hee Han, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 929 days.

(21) Appl. No.: 13/382,712

(22) PCT Filed: Jul. 7, 2010

(86) PCT No.: PCT/KR2010/004427
§ 371 (c)(1),
(2), (4) Date: Jan. 17, 2012

(87) PCT Pub. No.: WO2011/005032
PCT Pub. Date: Jan. 13, 2011

(65) Prior Publication Data
US 2012/0113941 A1 May 10, 2012

Related U.S. Application Data

(60) Provisional application No. 61/325,824, filed on Apr. 20, 2010, provisional application No. 61/262,159, filed on Nov. 18, 2009, provisional application No. 61/242,806, filed on Sep. 16, 2009, provisional
(Continued)

(51) Int. Cl.
*H04W 4/00* (2009.01)
*H04W 72/12* (2009.01)
(Continued)

(52) U.S. Cl.
CPC ........ *H04W 72/1289* (2013.01); *H04L 1/1861* (2013.01); *H04L 1/1887* (2013.01);
(Continued)

(58) Field of Classification Search
CPC ... H04L 5/001; H04L 5/0044; H04L 5/0053; H04L 1/1893; H04L 5/0091; H04L 1/1861; H04L 1/1887; H04L 5/008; H04W 72/1289; H04W 72/04
USPC .......................................................... 370/329
See application file for complete search history.

(56) References Cited

U.S. PATENT DOCUMENTS 7,697,622 B2   4/2010  Han et al.
8,068,841 B2   11/2011 Laroia et al.
(Continued)

FOREIGN PATENT DOCUMENTS

JP   2008-547278 A   12/2008
KR   10-2006-0135073 A   12/2006
(Continued)

OTHER PUBLICATIONS

International Search Report mailed Feb. 21, 2011 from corresponding International Application No. PCT/KR2010/004427.
(Continued)

*Primary Examiner* — Ayaz Sheikh
*Assistant Examiner* — Hai-Chang Hsiung
(74) *Attorney, Agent, or Firm* — Morgan, Lewis & Bockius LLP

(57) ABSTRACT

A method and apparatus for carrier scheduling in a multi-carrier system is provided. A terminal receives information, which indicates whether or not to perform a cross carrier scheduling process, from a base station. If it is determined, by means of said information, that the cross carrier scheduling process is to be performed, the terminal receives scheduling information about a second downlink carrier via a first downlink carrier, and receives downlink data from the second downlink carrier.

8 Claims, 17 Drawing Sheets

Related U.S. Application Data application No. 61/241,403, filed on Sep. 11, 2009, provisional application No. 61/239,425, filed on Sep. 2, 2009, provisional application No. 61/224,912, filed on Jul. 13, 2009, provisional application No. 61/223,700, filed on Jul. 7, 2009.

(51) Int. Cl.
*H04L 5/00* (2006.01)
*H04L 1/18* (2006.01)
*H04L 27/26* (2006.01)

(52) U.S. Cl.
CPC ............ *H04L1/1893* (2013.01); *H04L 5/001* (2013.01); *H04L 5/008* (2013.01); *H04L 5/0044* (2013.01); *H04L 5/0053* (2013.01); *H04L 5/0091* (2013.01); *H04L 27/2602* (2013.01)

(56) References Cited

U.S. PATENT DOCUMENTS

| | | | |
|---|---|---|---|
| 2005/0233752 A1 | 10/2005 | Laroia et al. | |
| 2006/0274712 A1* | 12/2006 | Malladi et al. | 370/345 |
| 2009/0088148 A1* | 4/2009 | Chung et al. | 455/423 |
| 2009/0161618 A1 | 6/2009 | Johansson et al. | |
| 2010/0232373 A1* | 9/2010 | Nory et al. | 370/329 |
| 2011/0085516 A1* | 4/2011 | Pajukoski et al. | 370/330 |
| 2013/0083764 A1 | 4/2013 | Kim et al. | |

FOREIGN PATENT DOCUMENTS

| | | |
|---|---|---|
| KR | 10-2007-0046680 A | 5/2007 |
| KR | 10-2009-0019662 A | 2/2009 |
| WO | 2006-138570 A3 | 12/2006 |

OTHER PUBLICATIONS

Supplementary European Search Report dated Jul. 20, 2015, for EP Patent Application No. 10797306.7.

Panasonic, "PDCCH coding and mapping for Carrier Aggregation," 3GPP TSG RAN WG1 Meeting #56bis, R1-091168 Seoul, Korea, Mar. 17, 2009.

Huawei, "PDCCH Design for Carrier Aggregation," 3GPP TSG RAN WG1 Meeting #56, R1-090815, Athens, Greece, Feb. 3, 2009.

Korean Office Action dated Jan. 20, 2016, in Koran Patent Application No. 10-2012-7000323.

Notice of Allowance issued in Korean Patent Application No. 10-2012-7000323 dated Jul. 25, 2016.

\* cited by examiner (A)

(B)

(A)

(B)

(A)

(B)

METHOD AND APPARATUS FOR CARRIER SCHEDULING IN A MULTI-CARRIER SYSTEM

This is a U.S. National Phase Entry of PCT Application No. PCT/KR2010/004427, filed Jul. 7, 2010, and claims the benefit of U.S. Provisional Application No. 61/325,824 filed Apr. 20, 2010; 61/262,159 filed Nov. 18, 2009; 61/242,806 filed Sep. 16, 2009; 61/241,403 filed Sep. 11, 2009; 61/239,425 filed Sep. 2, 2009; 61/224,912 filed Jul. 13, 2009; and 61/223,700 filed Jul. 7, 2009.

TECHNICAL FIELD

The present invention relates to wireless communication and, more specifically, to a method and apparatus for performing scheduling between a plurality of carries in a wireless communication system supporting multiple carriers.

BACKGROUND ART $3^{rd}$ Generation Partnership Project (3GPP) Long Term Evolution (LTE) that is the improvement of a Universal Mobile Telecommunications System (UMTS) is introduced as 3GPP release 8. The 3GPP LTE uses Orthogonal Frequency Division Multiple Access (OFDMA) in downlink and uses Single Carrier-Frequency Division Multiple Access (SC-FDMA) in uplink. The 3GPP LTE adopts Multiple Input Multiple Output (MIMO) having a maximum of 4 antennas. A discussion on 3GPP LTE-Advanced (LTE-A) that is the evolution of the 3GPP LTE is recently in progress.

Technology introduced in the 3GPP LTE-A includes a carrier aggregation, a relay, etc. A 3GPP LTE system is a single carrier system which supports only one bandwidth (i.e., one component carrier) of {1.4, 3, 5, 10, 15, 20} MHz. However, the LTE-A is introducing multiple carriers employing a carrier aggregation. A Component Carrier (CC) is defined by a center frequency and a bandwidth. A multi-carrier system uses a plurality of CCs each having a smaller bandwidth than the entire bandwidth.

As a plurality of CCs is used, a transmission station (e.g., a base station or a relay) needs to inform a reception station (e.g., a relay or user equipment) that a Physical Downlink Control Channel (PDCCH) over which channel allocation information about a downlink data channel or channel allocation information about an uplink data channel will be transmitted on what CC from among the plurality of CCs.

DISCLOSURE

Technical Problem

The present invention relates to a method and apparatus for performing scheduling between a plurality of CCs in a wireless communication system supporting a carrier aggregation.

Technical Solution

A method of scheduling carriers in a multi-carrier system according to an aspect of the present invention includes the steps of receiving information, indicating whether cross-carrier scheduling is performed, from a base station; receiving scheduling information about a second downlink carrier through a first downlink carrier, if the cross-carrier scheduling is determined to be performed based on the information; and receiving downlink data in the second downlink carrier, wherein the information indicating whether the cross-carrier scheduling is performed is received through a higher layer signal.

The steps of receiving scheduling information about a first uplink carrier through the first downlink carrier, if the cross-carrier scheduling is determined to be performed based on the information, and transmitting uplink data to the base station through the first uplink carrier may be further included.

The information indicating whether the cross-carrier scheduling is performed may be received through a Radio Resource Control (RRC) message.

The RRC message may further include index information about the first downlink carrier.

The RRC message may further include index information about the second downlink carrier.

The scheduling information about the second downlink carrier received through the first downlink carrier may include a Carrier Indication Field (CIF) indicating the second downlink carrier. The CIF may be indicated by an absolute index or a logical index of the second downlink carrier.

The first downlink carrier may be a predetermined downlink carrier.

A control channel transmitted in the first downlink carrier or the second downlink carrier may be determined as the number of independent OFDM symbols in a time domain.

The cross-carrier scheduling may be performed after N (N is a natural number equal to or greater than 1) subframes from a subframe in which the information indicating whether the cross-carrier scheduling is performed is received from the base station.

User Equipment performing cross-carrier scheduling in a multi-carrier system according to another aspect of the present invention includes a Radio Frequency (RF) unit transmitting and receiving radio signals; and a processor connected to the RF unit, wherein the processor receives information, indicating whether the cross-carrier scheduling is performed, from a base station, receives scheduling information about a second downlink carrier through a first downlink carrier, if the cross-carrier scheduling is determined to be performed based on the information, and receives downlink data in the second downlink carrier, wherein the information indicating whether the cross-carrier scheduling is performed is received through a higher layer signal.

Advantageous Effects

In wireless communication system using a plurality of CCs and supporting a carrier aggregation, it may be known that scheduling information is transmitted on what CC and scheduling may be performed between CCs.

MODE FOR INVENTION

Figure 1:
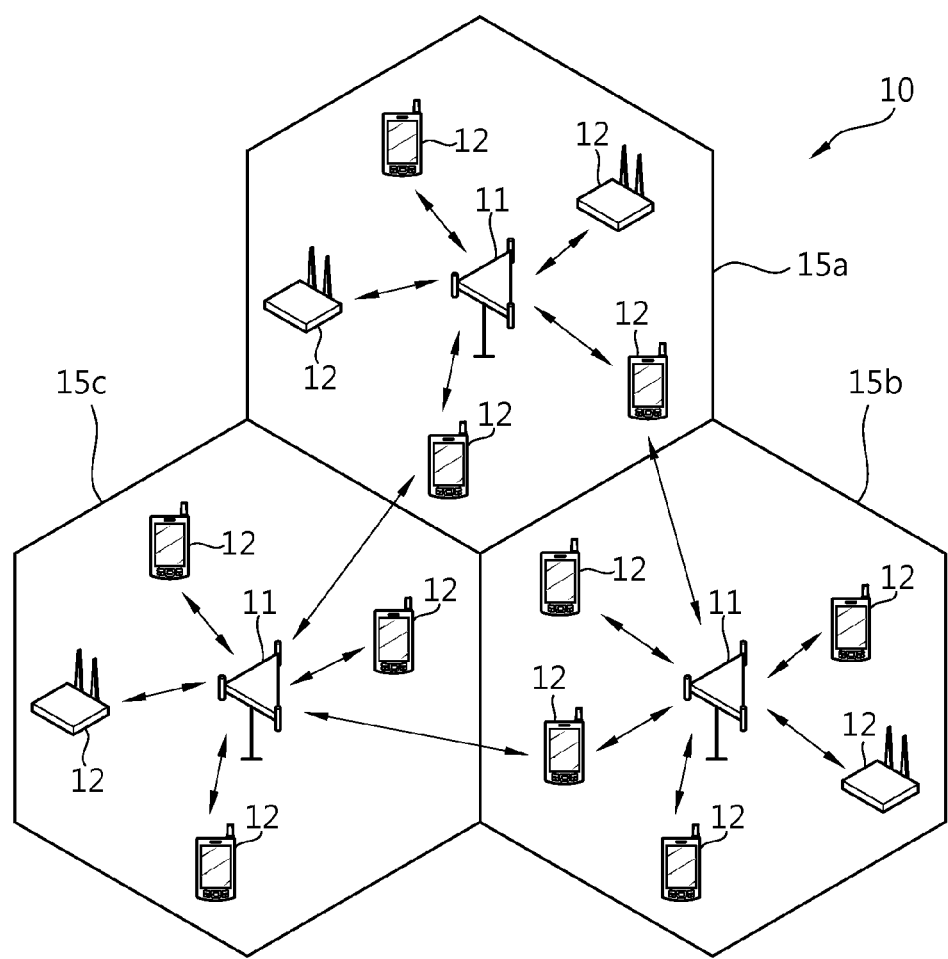
FIG. 1 shows a wireless communication system.

FIG. 1 shows a wireless communication system.

Referring to FIG. 1, the wireless communication system 10 includes one or more Base Stations (BSs) 11. The BSs 11 provide communication service to respective geographical areas (commonly called cells) 15a, 15b, and 15c. The cell may be classified into a plurality of areas (called sectors). User Equipment (UE) 12 may be fixed or mobile and may also be called another terminology, such as a Mobile Station (MS), a User Terminal (UT), a Subscriber Station (SS), a wireless device, a Personal Digital Assistant (PDA), a wireless modem, or a handheld device. The BS 11 commonly refers to a fixed station communicating with the UEs 12, and it may be called another terminology, such as an evolved-NodeB (eNB), a Base Transceiver System (BTS), or an access point.

Figure 2:
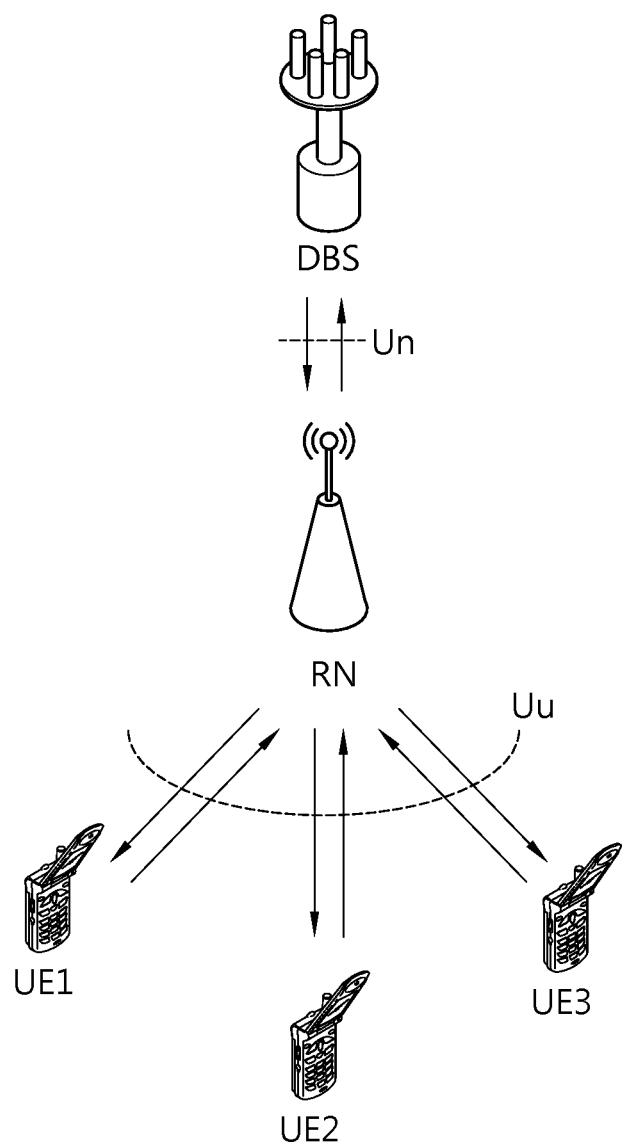
FIG. 2 shows a network system supporting a relay.

FIG. 2 shows a network system supporting a relay. The relay is technology relaying data between UE and a BS. A network node performing the relay function is called a Relay Node (RN). A BS managing one or more RNs is called a Donor BS (DBS).

A radio interface between UE and an RN is called a Uu interface, and a radio interface between an RN and a BS is called a Un interface. A link between UE and an RN is called an access link, and a link between an RN and a BS is called a backhaul link.

An RN manages UEs instead of a BS. The UE can be transparently provided with service from the BS through the RN. From a viewpoint of the BS, the RN can be provided with service as UE and can be provided with service as the BS of the UE.

Unless otherwise stated separately, downlink (DL) refers to communication from a BS to UE, and uplink (UL) refers to communication from UE to a BS.

The present invention, however, may also be applied to a network system supporting a relay. In an access link, downlink is communication from an RN to UE, and uplink is communication from UE to an RN. In a backhaul link, downlink is communication from a BS to an RN, and uplink is communication from an RN to a BS.

Figure 3:
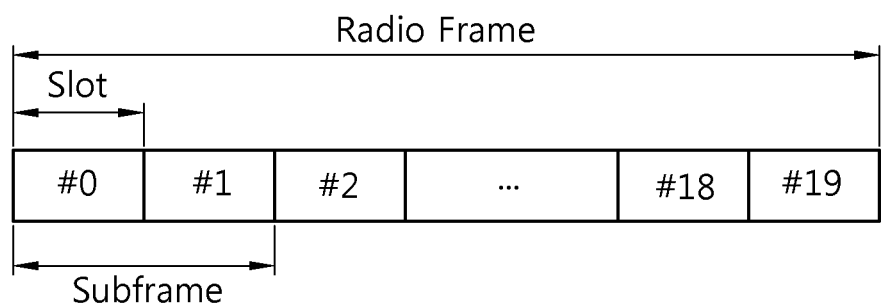
FIG. 3 shows the structure of a radio frame in $3^{rd}$ Generation Partnership Project (3GPP) Long Term Evolution (LTE).

FIG. 3 shows the structure of a radio frame in 3$^{rd}$ Generation Partnership Project (3GPP) Long Term Evolution (LTE). For the structure of the radio frame, reference may be made to Paragraphs 4.1 and 4.2 of 3GPP TS 36.211 V8.5.0 (2008-12) "Technical Specification Group Radio Access Network; Evolved Universal Terrestrial Radio Access (E-UTRA); Physical Channels and Modulation (Release 8)".

Referring to FIG. 3, the radio frame includes 10 subframes. One subframe includes two slots. The length of one subframe may be 1 ms, and the length of one slot may be 0.5 ms. The time that one subframe is taken to be transmitted is called a Transmission Time Interval (TTI). The TTI may be a minimum scheduling unit.

One slot may include a plurality of Orthogonal Frequency Division Multiplexing (OFDM) symbols in the time domain. The OFDM symbol is for representing one symbol period because 3GPP LTE uses OFDMA in downlink, and thus the OFDM symbol may be called another terminology. For example, the OFDM symbol may be called an SC-FDMA symbol. One slot is illustrated to include 7 OFDM symbols. The number of OFDM symbols included in one slot may be changed depending on the length of a Cyclic Prefix (CP).

According to 3GPP TS 36.211 V8.5.0 (2008-12), one subframe includes 7 OFDM symbols in a normal CP, and one subframe includes 6 OFDM symbols in an extended CP.

The structure of the radio frame is only illustrative, and the number of subframes included in the radio frame and the number of slots included in the subframe may be changed in various ways.

Figure 4:
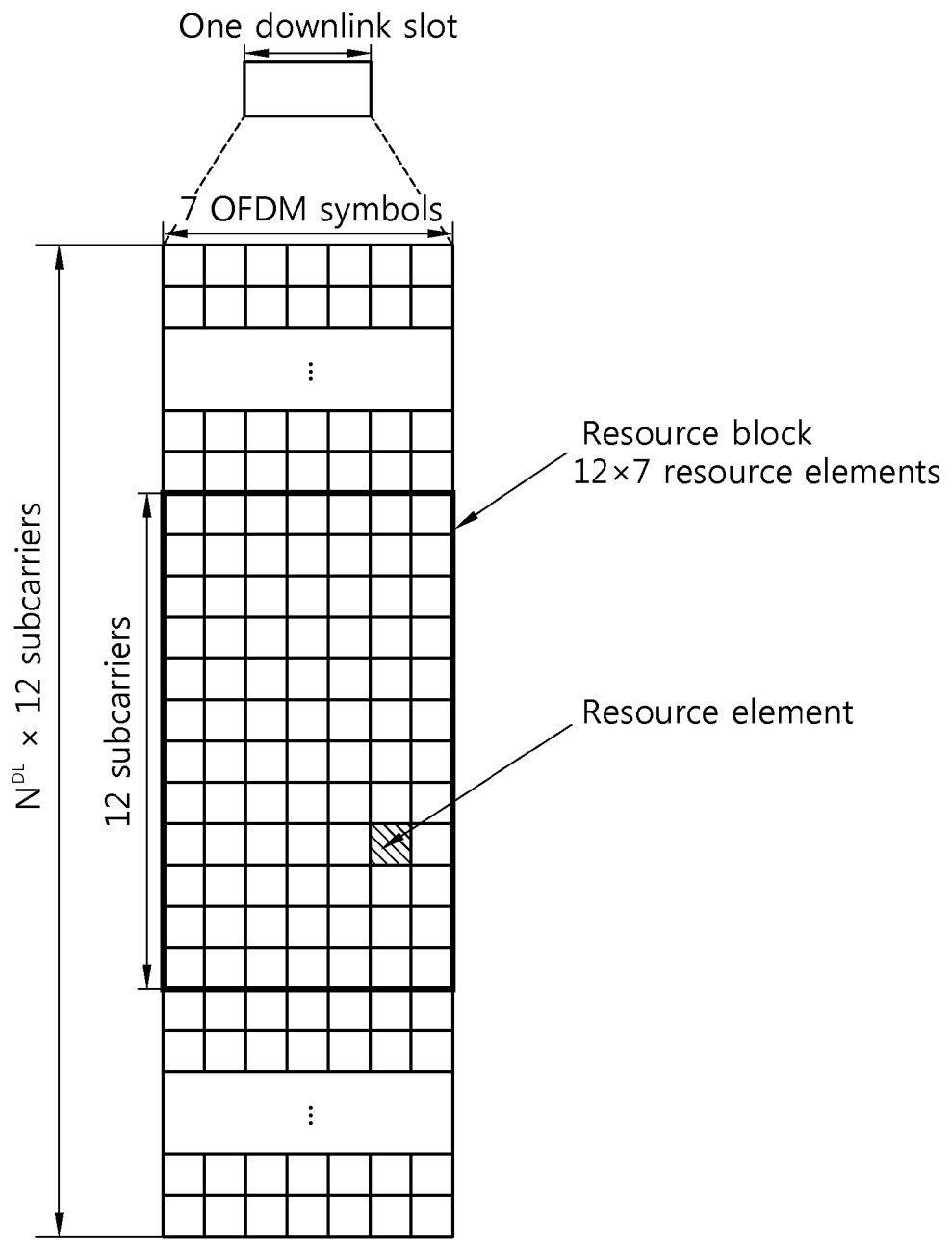
FIG. 4 is an exemplary diagram showing a resource grid for one downlink slot.

FIG. 4 is an exemplary diagram showing a resource grid for one downlink slot.

One slot includes a plurality of OFDM symbols in the time domain. A Resource Block (RB) is a unit of resource allocation, and it includes a plurality of contiguous subcarriers in one slot.

Here, one downlink slot is illustrated to include 7 OFDM symbols and one resource block is illustrated to include 12 subcarriers in the frequency domain, but not limited thereto.

Each element on the resource grid is called a resource element, and one resource block includes 12×7 resource elements. The number of resource blocks $N^{DL}$ included in a downlink slot depends on a downlink transmission bandwidth set in a cell. The resource grid described in FIG. 3 may also be applied to uplink.

As disclosed in 3GPP TS 36.211 V8.5.0 (2008-12), in LTE, physical channels may be divided into a Physical Downlink Shared Channel (PDSCH) and a Physical Uplink Shared Channel (PUSCH) which are data channels and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH) which are control channels.

Figure 5:
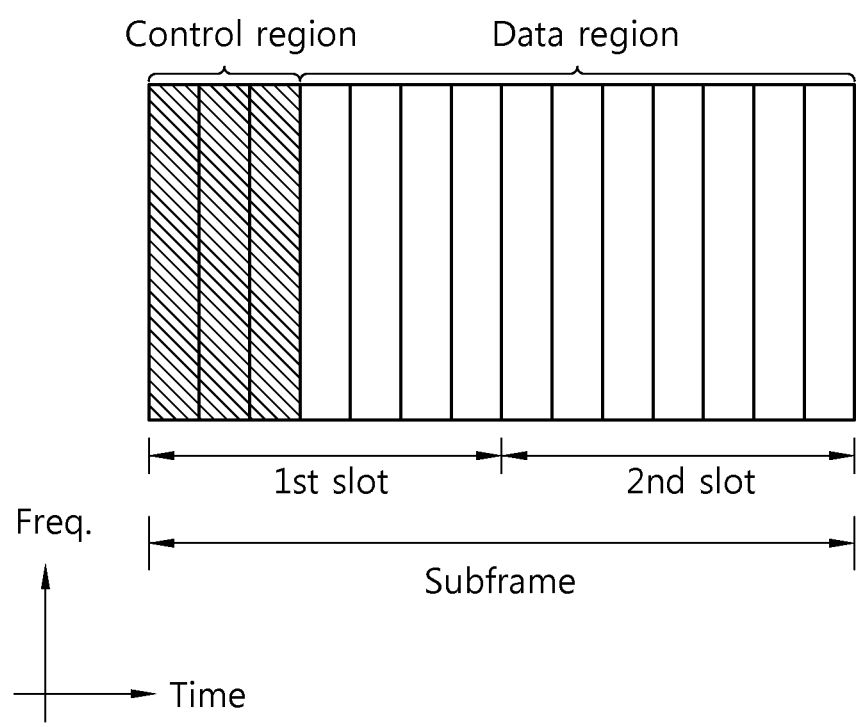
FIG. 5 shows the structure of a downlink subframe.

FIG. 5 shows the structure of a downlink subframe.

The subframe includes 2 consecutive slots. The former 3 OFDM symbols of the first slot within the subframe correspond to a control region to which the PDCCH is allocated, and the remaining OFDM symbols correspond to a data region to which the PDSCH is allocated. The control channels, such as the PCFICH and the PHICH, in addition to the PDCCH may be allocated to the control region.

The PCFICH transmitted in the first OFDM symbol of the subframe carries a Control Format Indicator (CFI) regarding the number of OFDM symbols (i.e., the size of a control region) which are used to transmit control channels in the subframe. UE first receives the CFI through the PCFICH and then monitors the PDCCH.

The PHICH carries positive-acknowledgement (ACK)/negative-acknowledgement (NACK) signals for an uplink Hybrid Automatic Repeat Request (HARQ). An ACK/NACK signal for uplink data transmitted by UE is transmitted over the PHICH.

Control information transmitted through the PDCCH is called Downlink Control Information (DCI). The DCI may include the resource allocation of a PDSCH (it is also called a downlink grant), the resource allocation of a PUSCH (it is also called as an uplink grant), a set of transmit power control commands for individual UEs within a specific UE group and/or the activation of a Voice over Internet Protocol (VoIP).

A use of the DCI format may be classified as in the following table.

| DCI FORMAT | CONTENTS |
| --- | --- |
| DCI Format 0 | Used in PUSCH scheduling |
| DCI Format 1 | Used the scheduling of one PDSCH codeword |
| DCI Format 1A | Used in the compact scheduling of one PDSCH codeword and a random access process |
| DCI Format 1B | Used in the compact scheduling of one PDSCH codeword including precoding information |
| DCI Format 1C | Used in the very compact scheduling of one PDSCH codeword |
| DCI Format 1D | Used in precoding and the compact scheduling of one PDSCH codeword including power offset information |
| DCI Format 2 | Used in the PDSCH scheduling of UEs set in a closed-loop spatial multiplexing mode |
| DCI Format 2A | Used in the PDSCH scheduling of UEs set in an open-loop spatial multiplexing mode |
| DCI Format 3 | Used to transmit the TPC command of a PUCCH and a PUSCH including 2-bit power adjustments |
| DCI Format 3A | Used to transmit the TPC command of a PUCCH and a PUSCH including 1-bit power adjustments |

The control region for the PDCCH consists of logical CCE columns (i.e., a plurality of Control Channel Elements (CCEs). The CCE column is a total of CCE sets forming a control region within one subframe. The CCE includes a plurality of Resource Element Groups (REGs). For example, the CCE may include 9 REGs. The REG includes a plurality of resource elements. For example, one REG may include 4 resource elements.

The PDCCH is transmitted over one CCE or an aggregation of several consecutive Control Channel Elements (CCEs). A format of the PDCCH and the number of possible bits of the PDCCH are determined by the number of CCEs forming a CCE aggregation. The number of CCEs used to transmit the PDCCH is called a CCE aggregation level. In order to form one PDCCH, {1, 2, 4, 8} CCEs may be used. Each elements of {1, 2, 4, 8} is called a CCE aggregation level.

Figure 6:
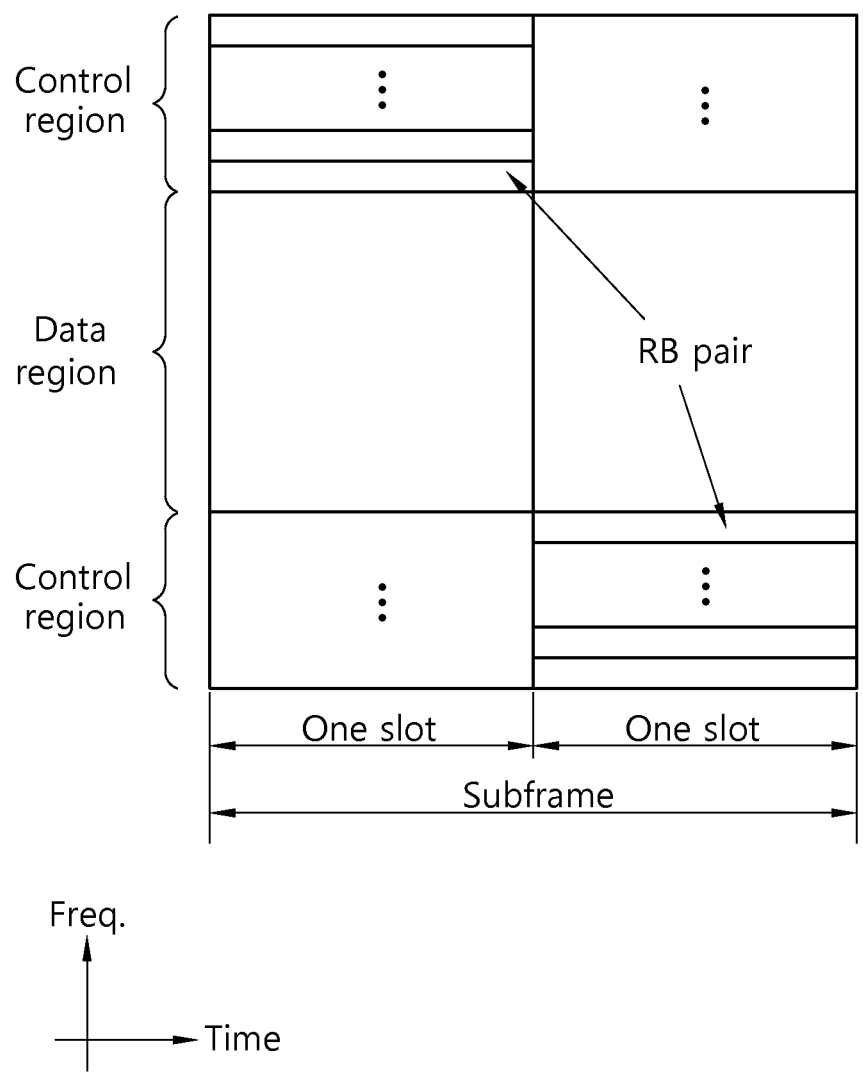
FIG. 6 shows the structure of an uplink subframe.

FIG. 6 shows the structure of an uplink subframe. For the structure of the uplink subframe, reference may be made to Paragraph 5.4 of 3GPP TS 36.211 V8.5.0 (2008-12) "Technical Specification Group Radio Access Network; Evolved Universal Terrestrial Radio Access (E-UTRA); Physical Channels and Modulation (Release 8)".

Referring to FIG. 6, the uplink subframe may be divided into a control region to which a Physical Uplink Control Channel (PUCCH) is allocated and a data region to which a Physical Uplink Shared Channel (PUSCH) is allocated.

A PUCCH for one UE is allocated in the form of a pair of Resource Blocks (RBs) 51 and 52 in the subframe. The RBs 51 and 52 belonging to an RB pair occupy different subcarriers in two slots. It is called that the RB pair allocated to the PUCCH has been subject to frequency hopping in a slot boundary.

According to 3GPP TS 36.211 V8.5.0 (2008-12), the PUCCH supports multiple formats. A PUCCH having a different number of bits per subframe may be used according to a modulation scheme dependent on a PUCCH format.

Table 2 below shows an example of a modulation scheme and the number of bits per subframe according to a PUCCH format.

| PUCCH Format | Modulation Scheme | Number of Bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used to transmit a Scheduling Request (SR), the PUCCH formats 1a/1b are used to transmit an ACK/NACK signal for an HARQ, the PUCCH format 2 is used to transmit a CQI, and the PUCCH formats 2a/2b are used to simultaneously transmit a CQI and an ACK/NACK signal. When only an ACK/NACK signal is transmitted in a subframe, the PUCCH formats 1a/1b are used. When an SR only is transmitted, the PUCCH format 1 is used. When an SR and an ACK/NACK signal are simultaneously transmitted, the PUCCH format 1 is used, and the ACK/NACK signal is modulated and transmitted over resources allocated to the SR.

All the PUCCH formats use a Cyclic Shift (CS) of a sequence in each OFDM symbol. A cyclically shifted sequence is generated by cyclically shifting a base sequence by a specific CS amount. The specific CS amount is indicated by a CS index.

Figure 7:
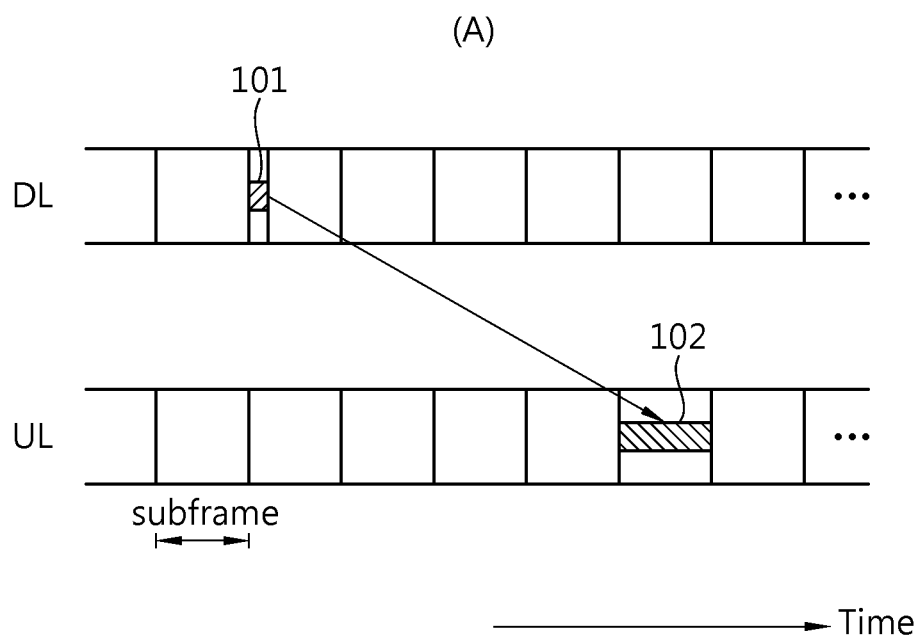
FIG. 7 shows the transmission and reception of data in 3GPP LTE.
Figure 7:
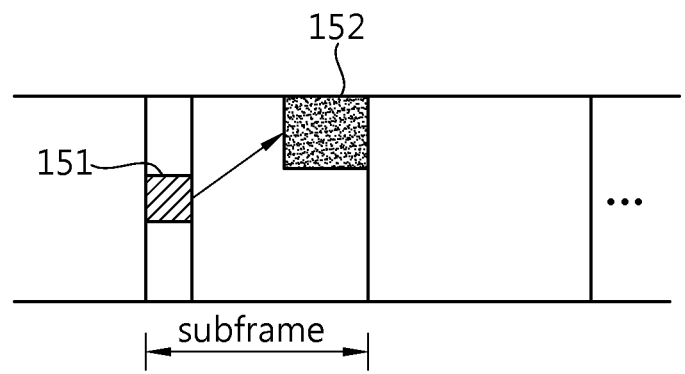

FIG. 7 shows the transmission and reception of data in 3GPP LTE.

FIG. 7(A) shows the transmission of uplink data. UE receives uplink resource allocation (or an uplink grant) through a PDCCH 101 by monitoring the PDCCH in a downlink subframe. The UE transmits an uplink transport block over a PUSCH 102 that is configured based on the uplink resource allocation.

FIG. 7(B) shows the reception of downlink data. UE receives a downlink transport block on a PDSCH 152 indicated by a PDCCH 151. The UE receives downlink resource allocation (or a downlink grant) over the PDCCH 151 by monitoring the PDCCH in a downlink subframe. The UE receives a downlink data packet over the PDSCH 152 indicated by the downlink resource allocation.

Figure 8:
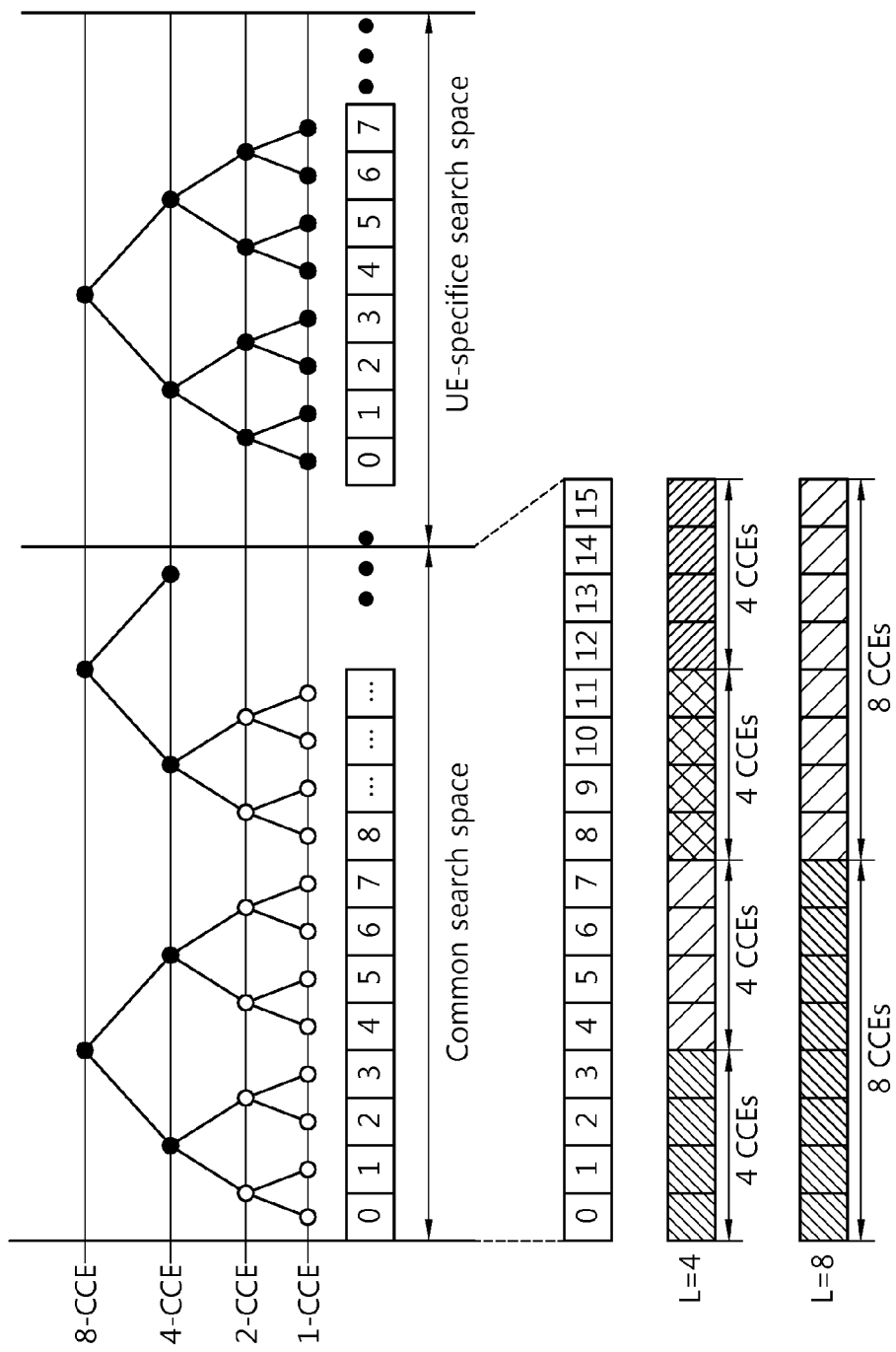
FIG. 8 is an exemplary diagram showing the monitoring of a PDCCH.

FIG. 8 is an exemplary diagram showing the monitoring of a PDCCH. For the monitoring of the PDCCH, reference may be made to Paragraph 9 of 3GPP TS 36.213 V8.5.0 (2008-12). In 3GPP LTE, blind decoding is used to detect the PDCCH. Blind decoding is a scheme for demasking a desired identifier from the Cyclic Redundancy Check (CRC) of a received PDCCH (it is called a PDCCH candidate) and for checking whether a relevant PDCCH is its own control channel by checking a CRC error. UE does not know that its own PDCCH is transmitted through what CCE aggregation level or what DCI format at which place within a control region.

A BS determines a PDCCH format according to a DCI to be transmitted to UE, attaches a CRC to the DCI, and masks a unique identifier (it is also called a Radio Network Temporary Identifier (RNTI)) to the CRC according to the owner or a use of the PDCCH.

In case of a PDCCH for a specific UE, a unique identifier (e.g., a Cell-RNTI (C-RNTI)) of the UE may be masked to the CRC. Alternatively, in case of a PDCCH for a paging message, a paging indication identifier (e.g., a Paging-RNTI (P-RNTI)) may be masked to the CRC. In case of a PDCCH for system information, a system information identifier (e.g., a System Information-RNTI (SI-RNTI)) may be masked to the CRC. In order to indicate a random access response (i.e., a response to a random access preamble transmitted by UE), a Random Access-RNTI (RA-RNTI) may be masked to the CRC. In order to indicate a Transmit Power Control (TPC) command for a plurality of UEs, a TPC-RNTI may be masked to the CRC.

A plurality of PDCCHs may be transmitted within one subframe. UE monitors the plurality of PDCCHs every subframe. Here, 'monitoring' means that the UE attempts to decode the PDCCH according to a monitored PDCCH format.

In 3GPP LTE, in order to reduce a load due to blind decoding, a search space is used. The search space may be called the monitoring set of CCEs for a PDCCH. The UE monitors the PDCCH within a relevant search space.

The search space is divided into a common search space and a UE-specific search space. The common search space is a space for which a PDCCH having common control information is searched. The common search space includes 16 CCEs having respective CCE indices 0~15 and supports a PDCCH having a CCE aggregation level {4, 8}. However, PDCCHs (having DCI formats 0 and 1A) carrying UE-specific information may also be transmitted in the common search space. The UE-specific search space supports a PDCCH having a CCE aggregation level {1, 2, 4, 8}.

Table 3 below indicates the number of PDCCH candidates monitored by UE.

| Search Space Type | Aggregation level L | Size [in CCEs] | Number of PDCCH candidates | DCI formats |
| --- | --- | --- | --- | --- |
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The size of the search space is determined by Table 3, and the common search space and the UE-specific search space have different start points of the search spaces. The start point of the common search space is fixed irrespective of a subframe, but the start point of the UE-specific search space may be different every subframe according to a UE identifier (e.g., a C-RNTI), a CCE aggregation level and/or a slot number within a radio frame. If the start point of the UE-specific search space is within the common search space, the UE-specific search space and the common search space may overlap with each other.

A multi-carrier system is now described.

A 3GPP LTE system supports a case in which a downlink bandwidth and an uplink bandwidth are differently set, but one Component Carrier (CC) is a precondition for the case. This means that, in the state where one CC is defined for each of downlink and uplink, 3GPP LTE supports only a case in which the downlink bandwidth is identical with or different from the uplink bandwidth. For example, the 3GPP LTE system may support a maximum of 20 MHz and have different uplink and downlink bandwidths, but supports only one CC in uplink or downlink.

A spectrum aggregation (also called a bandwidth aggregation or a carrier aggregation) supports a plurality of CCs. The spectrum aggregation is introduced in order to support an increased throughput, prevent an increase of costs due to the introduction of a broadband Radio Frequency (RF), and guarantee compatibility with the existing system. For example, if 5 CCs are assigned as the granularity of a carrier unit having a 20 MHz bandwidth, a maximum bandwidth of 100 MHz can be supported.

CCs may have different sizes (i.e., bandwidths). For example, assuming that 5 CCs are used to configure a 70 MHz bandwidth, the 70 MHz bandwidth may be configured using a 5 MHz carrier (CC #0)+a 20 MHz carrier (CC #1)+a 20 MHz carrier (CC #2)+a 20 MHz carrier (CC #3)+a 5 MHz carrier (CC #4).

A case in which the number of downlink CCs is identical with the number of uplink CCs or a downlink bandwidth is identical with an uplink bandwidth is called a symmetric aggregation. A case in which the number of downlink CCs is different from the number of uplink CCs or a downlink bandwidth is different from an uplink bandwidth is called an asymmetric aggregation.

In a multi-carrier system, one or more Medium Access Control (MAC) entities may manage and operate one or more CCs and transmit and receive the one or more CCs. The MAC entity has a higher layer of a physical layer (PHY layer). For example, the MAC entity may have an MAC layer and/or a higher layer.

Figure 9:
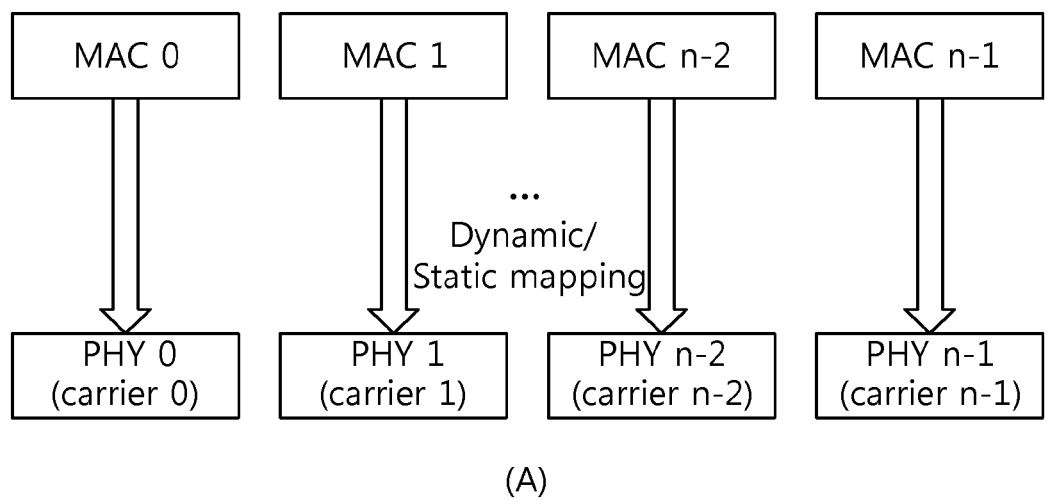
FIG. 9 shows an example of a transmitter and a receiver in which a multi-MAC operates multiple carriers.
Figure 9:
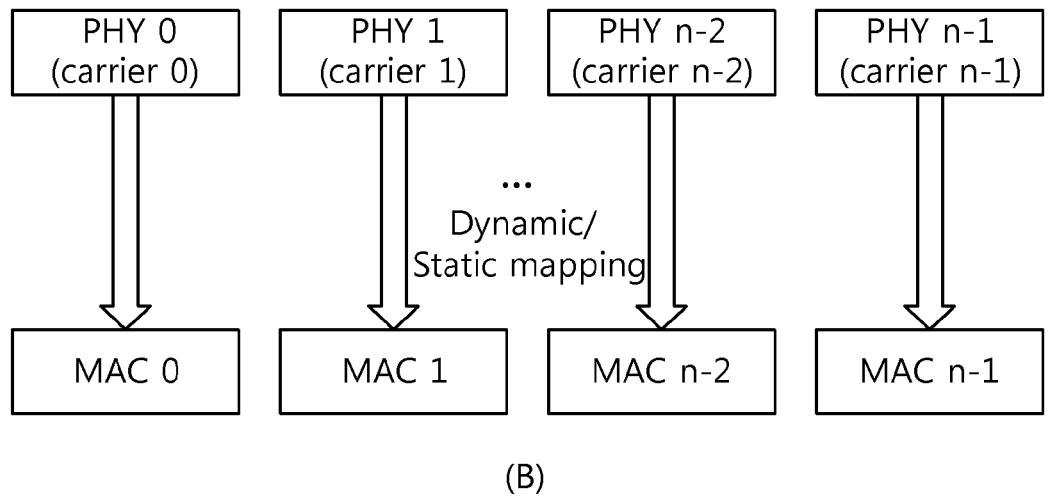

FIG. 9 shows an example of a transmitter and a receiver in which multiple MACs operate multiple carriers. (A) is a transmitter, and (B) is a receiver. A plurality of MACs MAC 0, . . . , MAC n-1 are mapped to a plurality of physical layers PHY 0, . . . , PHY n-1 in a 1:1 manner.

Each CC has an independent physical layer and an independent MAC layer. The MAC layer of the transmitter generates a MAC Protocol Data Unit (PDU) and performs L1/L2 scheduling for a MAC/Radio Link Control (RLC) layer. The MAC PDU generated by the MAC layer of the transmitter is converted into a transport block through a transport channel and then mapped to the physical layer.

Figure 10:
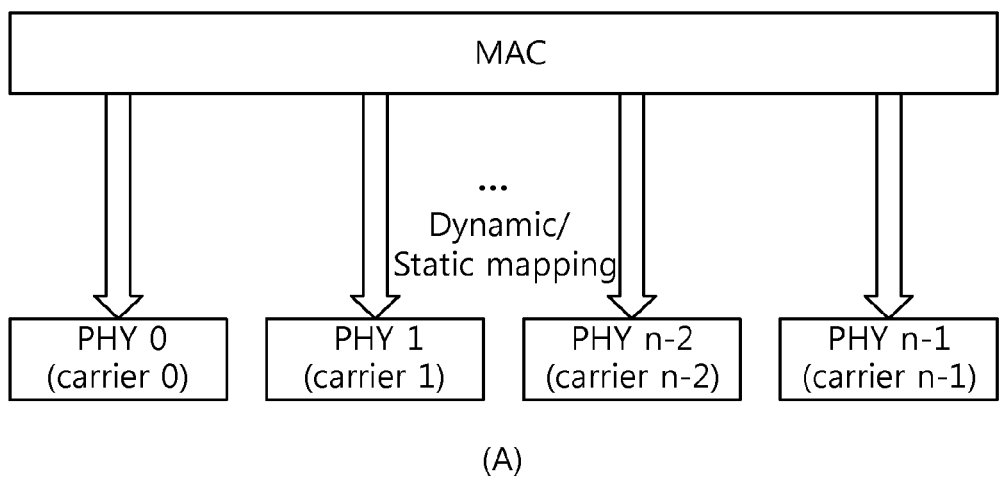
FIG. 10 shows an example of a transmitter and a receiver in which one MAC operates multiple carriers.
Figure 10:
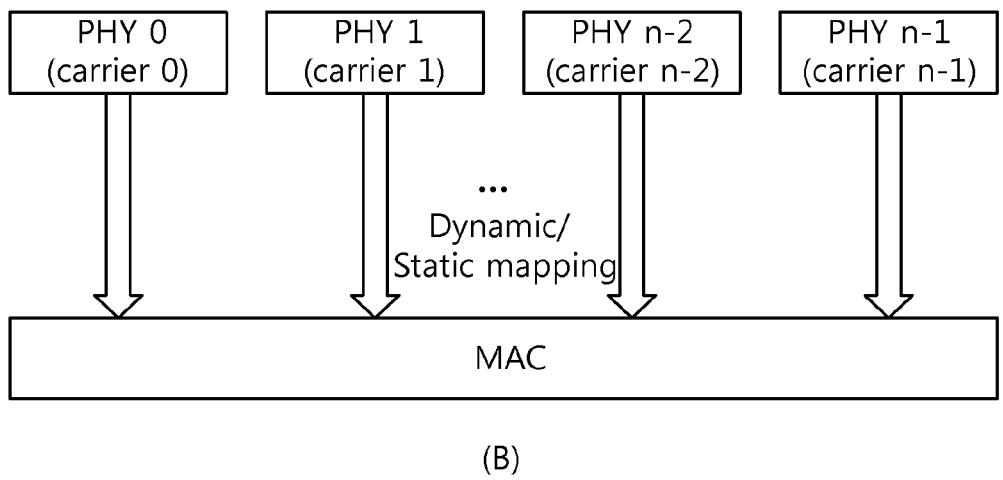

FIG. 10 shows an example of a transmitter and a receiver in which one MAC operates multiple carriers. (A) is a transmitter, and (B) is a receiver. One physical layer PHY corresponds to one CC, and a plurality of physical layers PHY 0, . . . , PHY n-1 is operated by one MAC. Mapping between the MAC and the plurality of physical layers PHY 0, . . . , PHY n-1 may be performed dynamically or statically.

The MAC PDU generated by the MAC layer of the transmitter is converted into a transport block through a transport channel, decomposed, and then mapped to the physical layers.

A PDSCH may be allocated to each CC. A PDCCH for indicating each PDSCH may be transmitted on the same CC or different CCs. The PDCCH may be allocated to each PDSCH or each CC, which is called a separated-coded PDCCH. Alternatively, a PDCCH for a plurality of PDSCHs may be allocated to each PDSCH or each CC, which is called a joint-coded PDCCH.

Hereinafter, the proposed invention may be applied to the separated-coded PDCCH and the joint-coded PDCCH. The PDCCH refers to the separated-coded PDCCH unless stated otherwise separately.

In order to support multiple carriers, a CC (i.e., the subject of measurement) may be allocated according to a condition in a UE-specific way. The CC to be measured ma be allocated for measurement for the normal transmission and reception of a physical channel after an RRC connection has been set up and may be allocated for measurement for cell selection/cell reselection.

If CC allocation information is controlled in L3 Radio Resource Management (RRM), the CC allocation information may be transmitted through UE-specific RRC signaling or may be transmitted through L1/L2 control signaling. The L1/L2 control signaling refers to signaling through a PDCCH or other dedicated physical control channels.

If the CC allocation information is controlled in a packet scheduler, the CC allocation information may be transmitted through L1/L2 control signaling.

Figure 11:
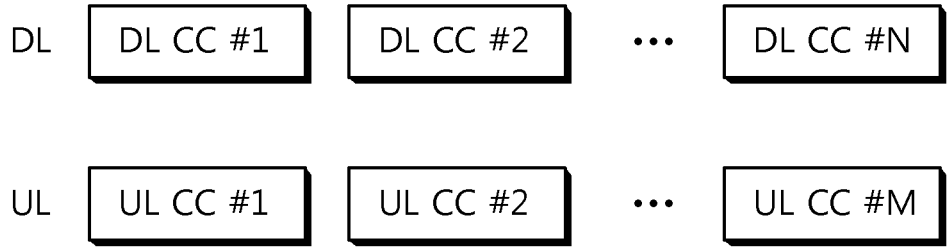
FIG. 11 shows an example of a multi-carrier system.

FIG. 11 shows an example of a multi-carrier system. The number of DL CCs is N, and the number of UL CCs is M. Each of N and M is a natural number, and at least one of N and M may be equal to or greater than 2.

UE may set up an RRC connection based on a specific CC through an initial access process. The initial access process includes a cell search process, a process of acquiring system information, and a random access process. After the initial access process is performed or the RRC connection is set up, the UE may receive multi-carrier configuration information from a BS (or a relay, hereinafter the same).

The multi-carrier configuration information is information for the operation of multiple carriers between a BS and UE (or an RN), and it may include information about CCs supportable by the UE and/or the BS. The multi-carrier configuration information may include information about CCs allocated to UE.

The multi-carrier configuration information may be transmitted through UE-specific signaling. UE may obtain the multi-carrier configuration information through an RRC message or dedicated signaling, such as a PDCCH.

If a CC configuration for UEs is performed every cell, BS, or cell cluster, the multi-carrier configuration information may be transmitted through a cell-specific RRC message or cell-specific and UE-common PDCCH signaling.

The multi-carrier configuration information may be obtained through system information during the initial access process. Alternatively, the multi-carrier configuration information may be obtained through system information or cell-specific RRC signaling which is received after the RRC connection is set up.

Figure 12:
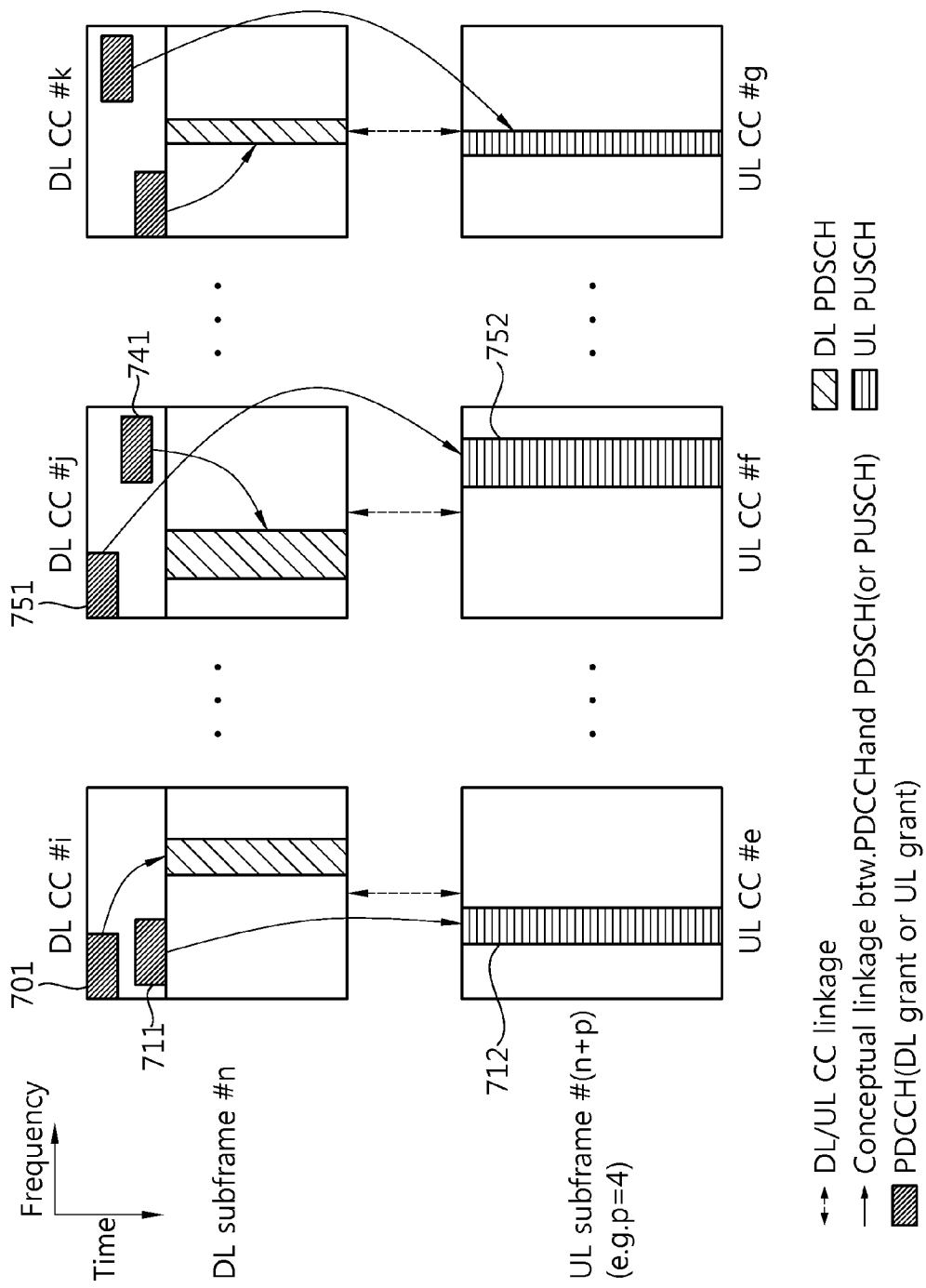
FIG. 12 shows an example of the operation of multiple carriers.

FIG. 12 shows an example of the operation of multiple carriers. For UE supporting multiple carriers, a CC configuration for a PDCCH used to receive a PDSCH or transmit a PUSCH needs to be defined. To this end, DL-UL CC linkage may be defined.

the DL-UL CC linkage refers to a mapping relationship between a DL CC on which a PDCCH carrying an UL grant is transmitted and a UL CC using the UL grant. Alternatively, the DL-UL CC linkage may be a mapping relationship between a DL CC (or a UL CC) on which data for an HARQ is transmitted and a UL CC (or a DL CC) on which an HARQ ACK/NACK signal is transmitted. A BS may inform UE of information about the DL-UL CC linkage through a higher layer message, such as an RRC message, or as part of system information. The linkage between the DL CC and the UL CC may be fixed, but may be changed between cells and UEs.

UE receives a PDSCH 702 on a DL CC #i on which a PDCCH 701 carrying a DL grant is transmitted. Likewise, the UE transmits a PUSCH 712 on a UL CC #e liked to the DL CC #i on which a PDCCH 711 carrying an UL grant is transmitted.

The UE receives a PDSCH 742 on a DL CC #j on which a PDCCH 741 carrying a DL grant is transmitted. Likewise, the UE transmits a PUSCH 752 on a UL CC #f linked to the DL CC #j on which a PDCCH 751 carrying an UL grant is transmitted.

FIG. 12 assumes that the number of DL CCs and the number of UL CCs are symmetrically configured, but may also be applied to an asymmetric case.

In the example of FIG. 12, the PDCCH-PDSCH pair is transmitted in the same CC. If the DL-UL CC linkage is overridden, if the transmit power of a specific DL CC or UL CC is lowered, or if the bandwidth of a specific DL CC or UL CC is small, in order to reduce PDCCH blind decoding overhead, a PDCCH and a relevant PDSCH may be transmitted on different CCs. Furthermore, the PDCCH and the relevant PUSCH may be transmitted on other UL CCs not UL CCs linked thereto. This is called cross-carrier scheduling. Soft silencing technology for significantly reducing the transmit power of a specific DL CC or UL CC or hard silencing technology for turning off the power of a specific DL CC or UL CC may be applied to the cross-carrier scheduling.

The cross-carrier scheduling may be implemented according to two methods. In the first method, for the transmission of a PDSCH in one or more DL CCs or the transmission of a PUSCH in one or more UL CCs for a specific UE or cell, a DL CC on which a PDCCH for a relevant DL grant or a relevant UL grant is transmitted is configured. This may be configured through an RRC message or a semi-static message, such as system information. In this second method, a DL CC or a UL CC on which a relevant PDSCH or PUSCH is transmitted is indicated through a DCI on a scheduled PDCCH.

Figure 13:
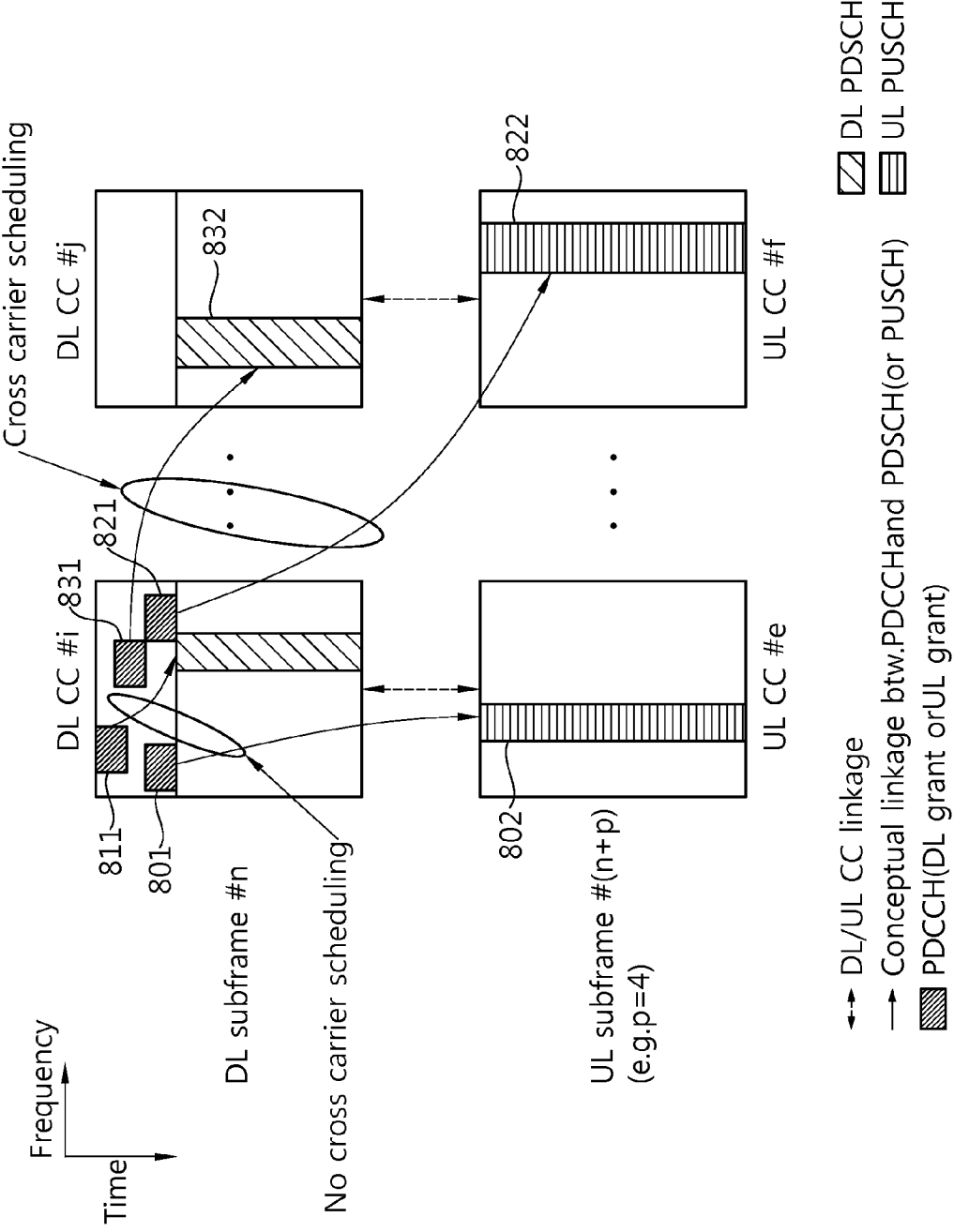
FIG. 13 shows an example of cross-carrier scheduling.

FIG. 13 shows an example of cross-carrier scheduling.

A PDCCH 801 carries an UL grant for the PUSCH 802 of a UL CC #e linked to a DL CC #i. A PDCCH 811 carries a DL grant for the PDSCH 812 of the DL CC #i. Accordingly, cross-carrier scheduling has not been applied to the PDCCH 801 and the PDCCH 811.

The PDCCH 821 of the DL CC #i carries an UL grant for the PUSCH 822 of a UL CC #f. The PDCCH 821 may be called a UL grant PDCCH. The PDCCH 831 of the DL CC #i carries a DL grant for the PDSCH 832 of the DL CC #j. The PDCCH 831 may be called a DL grant PDCCH. Cross-carrier scheduling has been applied to the PDCCH 821 and the PDCCH 831.

If cross-carrier scheduling is applied, the DL grants and/or the UL grants of several DL/UL CCs are transmitted in the control region of a specific DL CC. UE has to perform CRC demasking by using a UE-specific or carrier-specific C-RNTI and then check that a relevant DCI corresponds to control information about the PDSCH or the PUSCH of what DL CC or UL CC, if blind decoding is performed on a PDCCH in the relevant DL CC. Information indicating that the DCI on the PDCCH is for what CC is called a Carrier Indicator (CI) or a Carrier Indicator Field (CIF). The CIF may be explicitly included in a DCI format, included in control information subject to another encoding, or implicitly signaled.

A configuration scheme and a signaling method according to the application of cross-carrier scheduling according to an embodiment of the present invention are described below.

1. Definition and Bit Size of CIF

The CIF is information indicating that DL/UL grants on a PDCCH are for what DL/UL CCs. The CIF may be represented by a CC index (i.e., a DL CC index or a UL CC index). Here, the CC index may be represented in various forms.

In a first embodiment, the CC index may be given by a CC index for an absolute value in the frequency domain. The CC index may be given by the index of an absolute value for IMT bands or a series of bands defined in the 3GPP standard. For example, if the number of IMT bands or the number of bands defined in the 3GPP standard is N, the total number of CC indices is N. The bit size of the CIF may be given by ceil ($\log_2 N$). Here, ceil (x) indicates a minimum integer from among integers which are greater than or equal to x.

The number of DL CCs may be N1, and the number of UL CCs may be N2. N1 and N2 may have the same value or different values. The size of the CIF for the DL CC may become ceil ($\log_2 N1$), and the size of the CIF for the UL CC may become ceil ($\log_2 N2$). The CIF for the DL CC may be included in a DL grant PDCCH, and the CIF for the UL CC may be included in a UL grant PDCCH.

In a second embodiment, the CC index may be determined on the basis of logical order of a DL CC and/or a UL CC. For example, if the number of DL CCs or UL CCs configured by a BS is M (i.e., a natural number equal to or greater than 1), the bit size of the CIF may be given by ceil ($\log_2 M$).

If the index is determined based on logical order, the bit size may be reduced, as compared with a case in which the index is represented by the index of an absolute value for the band of a DL CC or a UL CC. For example, if the index of an absolute value for the band of a DL CC is given by {1, 3, 6, 7} and {1, 3, 6, 7} is represented by the index of an absolute value, N requires 3 bits. If the index is determined based on logical order, M may be represented by 2 bits.

In order to reduce blind decoding overhead (or in order to lower complexity in implementations or prevent ambiguities from occurring), the CIF may have a predefined bit size. For example, assuming that a greater value of the maximum number of DL CCs that may be configured by a cell or BS on a system and the maximum number of UL CCs that may be configured by the cell or BS on the system is A, the CIF may have a bit size of ceil ($\log_2 A$).

If the number of DL CCs and the number of UL CCs have different indices (e.g., M1 and M2), a CIF for the DL CC may have a bit size, such as ceil ($\log_2 M1$), and a CIF for the UL CC may have a bit size, such as ceil ($\log_2 M2$). In order to reduce blind decoding overhead, the CIF may have a predefined bit size. In this case, the bit size of a CIF for a DL CC and the bit size of a CIF for a UL CC may be designated identically or differently.

In a third embodiment, the index of the CIF may be defined based on logical order of DL CCs and/or UL CCs which are configured by a cell or a BS in a UE/cell/BS/cell cluster-specific way.

The bit size of the CIF becomes ceil ($\log_2 Q$) assuming that the number of DL CCs or UL CCs configured by a BS in a UE/cell/BS/cell cluster-specific way is Q. Alternatively, in order to prevent overhead/ambiguity occurring when UE performs blind decoding, the bit size of the CIF may have a predefined fixed value. The fixed value may be ceil ($\log_2 A$), if a greater value of the maximum number of DL CCs and the maximum number of UL CCs that may be configured by UE is A from the number of DL CCs or UL CCs configured by a BS in a UE/cell/BS/cell cluster-specific way. The value may be in common used in a DL grant PDCCH and a UL grant PDCCH.

In the bit size of the CIF, the number of DL CCs and the number of UL CCs that are configured by a BS in a UE/cell/BS/cell cluster-specific way may have different values Q1 and Q2. In this case, the bit sizes of CIFs transmitted for carrier-carrier scheduling through a DL grant PDCCH and a UL grant PDCCH may be defined as ceil ($\log_2 Q1$) and ceil ($\log_2 Q2$), respectively, according to the number of DL CCs Q1 and the number of UL CCs Q2 which are configured by a transmission station. In order to reduce blind decoding overhead, the CIF may have a predefined bit size. In this case, the bit size of the CIF for the DL CC and the bit size of the CIF for the UL CC may be defined identically or differently.

In the above embodiments, if the indices of IMT bands or bands defined in the 3GPP standard are given by absolute values w, x, y, and z and a relationship w<x<y<z is established, a DL CC #w, a DL CC #x, a DL CC #y, and a DL CC #z may be 4 DL CCs configured by a transmission station. Here, the DL CC #w may be defined as a DC CC index #0, the DL CC #x may be defined as a DC CC index #1, the DL CC #y may be defined as a DC CC index #2, and the DL CC #z may be defined as a DC CC index #3 by designating the sizes of absolute value indices in logical order.

The third embodiment may be applied to a case in which specific UE performs transmission on one DL CC and a UL CC (the UL CC might have been determined according to a predefined cell-common or cell-specific link relationship) linked to the DL CC and has its carriers configured through signaling, before setting up an RRC connection through an initial access process, a handover process, or cell selection/reselection processes for a specific cell. In this process, a link relationship between the DL CC and the UL CC may be set up through RRC signaling or L1/L2 control signaling in a UE/cell/BS/cell cluster-specific way.

For example, it is assumed that if CCs are allocated in a UE-specific way, the number of DL CCs allocated to UE from a cell is S and the number of UL CCs allocated to the UE from the cell is T. In this case, the bit size of a CIF transmitted through a DL grant PDCCH for the UE and/or the bit size of a CIF transmitted through a UL grant PDCCH for the UE become ceil ($\log_2 S$) and ceil ($\log_2 T$), respectively. For example, when S=4 and T=2, the bit size of the CIF transmitted through the DL grant PDCCH may be 2 bits, and the bit size of the CIF transmitted through the UL grant PDCCH may be 1 bit. The bit size of the CIF may be varied according to the allocation of UE-specific carriers which is performed through RRC signaling or L1/L2 PDCCH control signal signaling.

Alternatively, unlike in the above method, the bit size of the CIF may be fixed based on a maximum value from among the number of DL CCs and the number of UL CCs which are defined according to UE-specific capability. For example, if the maximum number of DL CCs that may be configured in UE is 4, the bit size of a CIF transmitted through a DL grant PDCCH may be fixed to 2 bits. Alternatively, if the maximum number of DL CCs that may be configured in UE is 5, the bit size of a CIF transmitted through a DL grant PDCCH may be fixed to 3 bits. Likewise, if the maximum number of U CCs that may be configured in UE is 3 or 4, the bit size of a CIF that may be included in and transmitted through a UL grant PDCCH may be fixed to 2 bits. If the maximum number of U CCs that may be configured in UE is 2, the bit size of a CIF that may be included in and transmitted through a UL grant PDCCH may be fixed to 1 bit. In the above examples, the bit size of the CIF included in the UL grant PDCCH and the bit size of the CIF included in the DL grant PDCCH may be identically fixed to a bit size having a greater value.

Alternatively, the bit size of a CIF that is included in and transmitted through a DL grant PDCCH or a UL grant PDCCH may be directly informed through RRC signaling or L1/L2 PDCCH control signal signaling.

The bit size of a CIF is determined based on the index value of a DL CC or the number of DL CCs, or the index value of a UL CC or the number of UL CCs that is configured by a transmission station (a cell, a BS, or a relay) for a reception station (UE or a relay) in a UE/relay/cell-specific way, but not limited thereto. For example, a method of performing sub-grouping within a UE DL CC set or a UE UL CC set according to a predefined rule, an implicit method, or an explicit method through a higher layer signal may be used. In this case, the transmission station may inform the reception station of information about a sub-group to which a carrier on which the reception station receives a scheduling PDCCH belongs. Accordingly, the reception station (e.g., UE) may know that it must receive the scheduling PDCCH on a carrier belonging to what sub-group within the UE DL CC set or the UE UL CC set. Accordingly, the bit size of a CIF transmitted through a DL grant PDCCH or a UL grant PDCCH included in the scheduling PDCCH may be determined based on the number of DL CCs or a maximum index value of the DL CC or the number of UL CCs within the sub-group or a maximum index value of the UL CC. If the number of DL CCs within the sub-group or the maximum index value of the DL CC is X, the bit size of a CIF transmitted through the DL grant PDCCH may be set to ceil ($\log_2 X$).

When the index of a CIF uses the logical indices of DL/UL CCs, the following methods may be taken into consideration.

First, if a UE DL CC set specific to UE is defined for the specific UE, but a UE UL CC set is not defined, the bit size of a CIF included in a UL grant PDCCH may be set as ceil ($\log_2 M2$) on the basis of the number of UL CCs configured by a transmission station (a cell, a BS, or a relay, hereinafter the same).

If a UE UL CC set specific to UE is defined for the specific UE, but a UE DL CC set is not defined, however, the bit size of a CIF included in a DL grant PDCCH may be set as ceil ($\log_2 M1$) on the basis of the number of DL CCs configured by a transmission station.

If both a UE DL CC set and a UE UL CC set specific to UE are not defined for the specific UE, the bit sizes of CIFs transmitted through a DL grant PDCCH and a UL grant PDCCH for cross-carrier scheduling may be set as ceil ($\log_2 M1$) and ceil ($\log_2 M2$), respectively, according to the number of DL CCs M1 and the number of UL CCs M2 which are configured by a transmission station.

Second, a transmission station (a cell, a BS, or a relay) may change a UE DL CC set and/or a UE UL CC set, already configured in UE, on the basis of a specific point of time. That is, a UE DL CC set and/or a UE UL CC already configured in UE may be changed into another UE DL CC set and/or another UE UL CC set. If the UE DL CC set and/or the UE UL CC set are dynamically changed as described above, the bit sizes of CIFs transmitted through a DL grant PDCCH and a UL grant PDCCH for cross-carrier scheduling may be defined as ceil ($\log_2 M1$) and ceil ($\log_2 M2$), respectively, according to the number of DL CCs M1 and the number of UL CCs M2 which are configured by a transmission station.

Third, it is assumed that a transmission station (a cell, a BS, or a relay) configures a UE DL CC set and/or a UE UL CC set in a UE-specific way. Specific UE may perform an initial access procedure on the basis of one CC before receiving configuration information about the UE DL CC set and/or the UE UL CC set from a transmission station. In this case, the UE performs blind decoding on a PDCCH on one DL CC that is initially set or detected. Here, the transmission station may include a CIF in the DCI format of a DL grant PDCCH or a UL grant PDCCH included in the one DL CC and transmit the DCI format including the CIF. Here, the bit sizes of the CIFs may be temporally set as ceil ($\log_2 M1$) and ceil ($\log_2 M2$), respectively, according to the number of DL CCs M1 and/or the number of UL CCs M2 which are configured by the transmission station.

Fourth, if a transmission station (a cell, a BS, or a relay) configures a UE DL CC set and/or a UE UL CC set in a UE-specific way, UE performing handover from a serving cell to a target cell may become problematic. i) The UE may receive configuration information about the UE DL CC set and/or the UE UL CC set of the target cell through a handover command from the serving cell. ii) The UE may receive the number of DL CCs and/or UL CCs, configured by the target cell, and the indices of the DL CCs and/or the UL CCs through signaling in response to a handover command from the serving cell. After the handover process is finished, the UE receives the configuration information about the UE DL CC set and/or the UE UL CC set that is specific to the UE from the target cell. Before receiving the configuration information, the UE may perform blind decoding on a PDCCH on one DL CC that has been designated or configured based on the handover command. In this case, a CIF for cross-carrier scheduling may be included in the PDCCH. Here, the bit sizes of the CIFs may be defined as ceil ($\log_2 M1$) and ceil ($\log_2 M2$), respectively, according to the number of DL CCs M1 and/or the number of UL CCs M2 which are configured by the transmission station.

2. Method of Configuring Cross-Carrier Scheduling and Relevant Signaling Method

Cross-carrier scheduling may always be applied according to the DL CC and UL CC configurations of a transmission station (cell or the BS) or according to purposes of reducing blind decoding overhead for a reception station (e.g., UE).

Alternatively, the basic carrier scheduling of FIG. 12 and the cross-carrier scheduling of FIG. 13 may be selectively applied according to time by applying technology, such as sift/hard silencing, in a time-varying way. Which one of the basic carrier scheduling and the cross-carrier scheduling will be applied may be informed through UE-specific, cell-specific, or relay-specific RRC signaling and may be informed through UE-specific, cell-specific, or relay-specific L1/L2 PDCCH control signal signaling. A method of signalizing information indicating whether the cross-carrier scheduling is performed, indicating which one of the basic carrier scheduling and the cross-carrier scheduling will be applied, may be chiefly divided into explicit signaling and implicit signaling.

First, the explicit signaling method is to inform that the cross-carrier scheduling and the basic carrier scheduling will be applied for every transmission station (cell, a BS, or a relay) or for every UE through UE/cell-specific RRC signaling or UE/cell-specific L1/L2 PDCCH control signal signaling. In this signaling method, timing when the basic carrier scheduling or the cross-carrier scheduling is applied may be started from a subframe subsequent to an N (>1 or 0) subframe in a DL subframe in which the RRC signaling or the PDCCH control signal signaling was received. N may be a predefined value. For example, if a transmission station transmits a control signal informing that cross-carrier scheduling is to be applied at a subframe #i, cross-carrier scheduling may start being applied from a subframe #(i+N). Furthermore, UE which has received the control signal, informing that the cross-carrier scheduling is to be applied at the subframe #i may know that the cross-carrier scheduling is to be applied from the subframe #(i+N) and perform blind decoding according to the cross-carrier scheduling. That is, the UE may perform blind decoding on the assumption that a CIF is included in a PDCCH from the subframe #(i+N).

Here, a 1 bit mode indicator may be included in RRC parameters included in the RRC signaling. The 1 bit mode indicator may inform a reception station (UE or a relay) of the basic carrier scheduling (e.g., '0') or the cross-carrier scheduling (e.g., '1') according to its value. Alternatively, additional fields may be included in the RRC signaling in addition to the 1 bit mode indicator. For example, the fields may include the index indicators of one or more DL CCs and/or the index indicators of UL CCs to which cross-carrier scheduling is applied, the index indicator of a DL CC on which a scheduling PDCCH is transmitted, and the bit size fields of CIFs included in and transmitted through a DL grant PDCCH and/or a UL grant PDCCH.

UE that has received the RRC signaling including the RRC parameters may know the bit size of the CIF included in the DL grant PDCCH when performing PDCCH blind decoding and may know the bit size of the CIF included in the UL grant PDCCH, if necessary.

Next, the implicit signaling method is that UE determines cross-carrier scheduling without additional signaling. If information about a PDCCH monitoring set is separately transmitted through RRC signaling or L1/L2 PDCCH control signal signaling, UE compares the information about the PDCCH monitoring set separately transmitted with the number of DL CCs or an index configuration on a UE DL CC set configured in basic carrier scheduling. If, as a result of the comparison, the information about the additional PDCCH monitoring set is identical with the number of DL CCs or the index configuration on the UE DL CC set configured in the basic carrier scheduling, the UE recognizes that the basic carrier scheduling is to be applied. If the information about the additional PDCCH monitoring set is different from the number of DL CCs or the index configuration on the UE DL CC set configured in the basic carrier scheduling (e.g. the number of DL CCs configured in the information about the PDCCH monitoring set is smaller than that of UE-specific carrier allocation or the number of DL CCs, or the index configuration is different), the UE recognizes that the cross-carrier scheduling is to be applied.

For example, if a transmission station transmits information about a PDCCH monitoring set different from a DL CC set, allocated to UE, in a subframe #i, the UE may start applying cross-carrier scheduling from a subframe #(i+N). Furthermore, the UE that has received the information about the PDCCH monitoring set different from the DL CC set in the subframe #i, the UE may recognize that cross-carrier scheduling is to be applied from the subframe #(i+N) and perform blind decoding according to the cross-carrier scheduling. That is, the UE may perform blind decoding on the assumption that a CIF is included in the PDCCH from the subframe #(i+N).

In this case, the bit size of the CIF included in a DL grant PDCCH or a UL grant PDCCH may be determined depending on the number of DL CCs (S in number) and/or the number of UL CCs (T in number) which is configured on UE-specific carrier allocation or the DL CC set (it may be cell-specific or relay-specific, if necessary) (ceil ($\log_2(S)$) and ceil ($\log_2(T)$)).

Alternatively, the bit size of the CIF included in the DL grant PDCCH or the UL grant PDCCH may be fixed to a fixed value. The bit size of the CIF may be determined depending on the maximum number of DL CCs and/or the maximum number of UL CCs that may be allocated to the UE.

The PDCCH monitoring set may be explicitly defined as RRC parameters and signalized. In this case, a reception station (UE or a relay) may receive the PDCCH monitoring set from a transmission station (cell, a BS, or a relay) in a reception station-specific (i.e., UE-specific or relay-specific) way or may receive the PDCCH monitoring set from a transmission station (cell, a BS, or a relay) in a cell-specific way.

The PDCCH monitoring set may be transmitted through L1/L2 PDCCH control signal signaling. Alternatively, the PDCCH monitoring set may be implicitly configured as a combination of two or more different kinds of parameters from among the RRC parameters. For example, the PDCCH monitoring set may be configured as a combination of an indicator for a UE DL CC set included in the RRC parameters and an indicator indicating the index of a DL CC on which a PDCCH is transmitted within the UE DL CC set. Alternatively, the PDCCH monitoring set may be configured as a combination of an indicator for a UE DL CC set and an indicator indicating the index of a DL CC on which a UE-specific PDCCH is not transmitted within the UE DL CC set.

The PDCCH monitoring set may be divided into a set of PDCCHs associated with downlink PDSCH transmission (it may be called a PDCCH monitoring set for DL PDSCH transmission) and a set of PDCCHs associated with uplink PUSCH transmission (it may be called a PDCCH monitoring set for UL PUSCH transmission), defined, and applied. In this case, a CIF included in a DL grant PDCCH may be set on the basis of a relation between the PDCCH monitoring set for DL PDSCH transmission and the UE DL CC set, and a CIF included in a UL grant PDCCH may be on the basis of a relation between the PDCCH monitoring set for UL PUSCH transmission and a UE UL CC set.

3. Method of Transmitting PHICH when Cross-Carrier Scheduling is Applied/Released A PHICH carries an ACK/NACK signal for an uplink HARQ.

Figure 14:
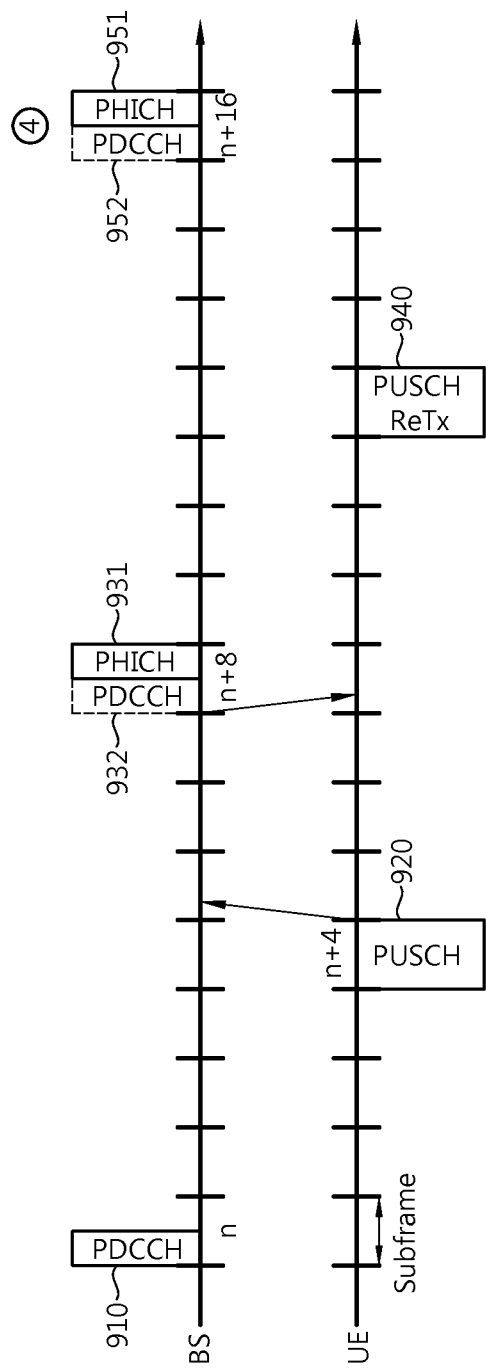
FIG. 14 shows an uplink synchronization HARQ in 3GPP LTE.

FIG. 14 shows an uplink synchronization HARQ in 3GPP LTE.

UE receives an initial UL grant from a BS through a PDCCH 910 in an $n^{th}$ subframe. The UE transmits an uplink transport block through a PUSCH 920 by using an UL grant in an $(n+4)^{th}$ subframe.

The BS transmits an ACK/NACK signal for the uplink transport block through a PHICH 931 in an $(n+8)^{th}$ subframe. The ACK/NACK signal indicates a reception confirmation for the uplink transport block, the ACK signal indicates a reception success, and the NACK signal indicates a reception failure. When the ACK/NACK signal is a NACK signal, the BS may transmit a retransmission UL grant through the PDCCH 932 or may not transmit an additional UL grant.

The UE that has received the NACK signal transmits a retransport block through a PUSCH 940 in an $(n+12)^{th}$ subframe. In order to transmit the retransport block, the UE uses a received retransmission UL grant when the retransmission UL grant is received through the PDCCH 932 and uses an initial UL grant when the retransmission UL grant is not received.

After initial transmission in the $(n+4)^{th}$ subframe, retransmission is performed in the $(n+12)^{th}$ subframe, and thus a synchronization HARQ is performed by using 8 subframes as an HARQ cycle.

In a multi-carrier system, a PHICH carrying an ACK/NACK signal for PUSCH transmission may be transmitted on a DL CC on which a UL grant PDCCH for PUSCH transmission has been transmitted.

However, if cross-carrier scheduling is applied, the PHICH may be transmitted on a DL CC other than the DL CC on which the UL grant PDCCH for PUSCH transmission has been transmitted. In other words, the PDCCH monitoring set of a reception station (UE or relay) using cross-carrier scheduling as a precondition may be differently set from a DL CC on which the PHICH is transmitted.

That is, if UE is informed of a cross-carrier scheduling configuration according to explicit signaling or implicit signaling, the UE may apply the cross-carrier scheduling configuration after an N subframe since a subframe in which an explicit or implicit signal, informing that cross-carrier scheduling has been set, has been received. In this case, if the UE maintains the method of transmitting the PHICH on the DL CC on which the UL grant for PUSCH transmission has been transmitted regarding PUSCH transmission before applying the cross-carrier scheduling configuration, the PHICH may be transmitted on a DL CC not included in a PDCCH monitoring set after the cross-carrier scheduling configuration. For example, the UE may transmit a PUSCH on a UL CC #1, and a BS may transmit a PHICH in a DL CC #1 on which an UL grant for the PUSCH transmission of the UL CC #1 has been transmitted according to basic carrier scheduling. In this case, a PDCCH monitoring set may be configured by applying cross-carrier scheduling between a point of time at which the PUSCH was transmitted and a point of time at which the PHICH was transmitted. If the DL CC #1 is not included in the PDCCH monitoring set, the UE may receive the PHICH on a DL CC different from the PDCCH monitoring set.

A method that may be basically applied in order to solve the problem is to define that the PHICH is transmitted in the DL CC on which the UL grant PDCCH for the PUSCH transmission of the UE has been transmitted. This method may be changed when cross-carrier scheduling is activated.

In a first embodiment, when a cross-carrier scheduling configuration signal is received explicit or implicitly, a reception station (UE or a relay) does not receive a PHICH in a DL CC on which an UL grant PDCCH for a PUSCH transmitted before the cross-carrier scheduling configuration signal is activated has been received, but receive the PHICH in a PDCCH monitoring set according to the cross-carrier scheduling configuration (DL CCs may be previously defined when the number of DL CCs within the PDCCH monitoring set is plural or a DL CC defined as a primary DL CC or an anchor DL CC).

Alternatively, cross-carrier scheduling may be applied to a UL CC on which a PUSCH has been transmitted, and a DL CC on which an UL grant PDCCH has been transmitted may be newly configured. When configuration information about the DL CC is received through RRC signaling or L1/L2 control signaling, UE may receive a PHICH on the new DL CC. That is, a BS transmits the PHICH on the new DL CC on which the UL grant PDCCH is transmitted. In this case, the configuration of the PHICH resources may be determined based on the configuration of the PHICH resources applied when cross-carrier scheduling is configured or an additional RRC configuration or a special rule may be applied. The BS may perform transmission by configuring the PHICH DL CC according to a method performed by the UE and configuring a PHICH group and channel resources.

In a second embodiment, if the capability of UE is detected or UE detects a BS-specific condition that cross-carrier scheduling can be applied, the method of transmitting a PHICH on a DL CC on which a UL grant PDCCH has been transmitted may not be used, but the PHICH may be transmitted through a UE (or relay)-specific or cell-specific primary/anchor DL CC. A reception station (UE or a relay) and a transmission station (BS) performs a process of receiving and transmitting the PHICH according to the above-described method.

4. Method of Recognizing Dl Cc on which a Scheduling PDCCH is Transmitted when Cross-Carrier Scheduling is Applied If cross-carrier scheduling is applied, a plurality of DL CCs on which a scheduling PDCCH (i.e., a PDCCH carrying a UL grant or a DL grant) can be transmitted may be configured. It is necessary to define that the DL grant PDCCH and the UL grant PDCCH will be transmitted on what DL CC from among the plurality of DL CCs.

In a first embodiment, a link relationship between the DL CC on which the scheduling PDCCH is transmitted and a DL CC on which a PDSCH is transmitted (or a UL CC on which a PUSCH is transmitted) may be previously determined or implicitly determined.

A PDCCH-PDSCH link relationship between the DL CC on which the PDSCH is transmitted and a DL CC on which a DL grant PDCCH is transmitted and/or a PDCCH-PUSCH link relationship between the UL CC on which the PUSCH is transmitted and a DL CC on which a UL grant PDCCH is transmitted may be determined on the basis of a predetermined rule. That is, the PDCCH-PDSCH link relationship and/or the PDCCH-PUSCH link relationship may be set up on the basis of a DL CC index and a UL CC index to which cross-carrier scheduling is applied, the C-RNTI of UE, the index value of a subframe, etc. according to a predetermined rule, without additional explicit signaling.

For example, it is assumed that the number of scheduling carriers (i.e., the number of DL CCs on which a DL grant PDCCH or a UL grant PDCCH can be transmitted) is A. Here, the DL CCs (i.e., the scheduling carriers) may have logical indices ranging from #0 to #(A-1). Furthermore, it is assumed that the carrier index of a DL CC on which a PDSCH can be transmitted other than the DL CCs is i. It is also assumed that the absolute index of a carrier for the IMT band of UL CCs on which a PUSCH not linked to a DL CC on which a scheduling PDCCH can be transmitted can be transmitted or for a band on the 3GPP standard or a carrier index logically designated in carrier allocation between the DL CC and the UL CC is j. Under the above assumption, the DL grant PDCCH regarding a DL CC #i on which the PDSCH is transmitted may be transmitted through a DL CC #(i % A) from among the DL CC #0 to the DL CC #(A-1). The UL grant PDCCH regarding a UL CC #j on which the PUSCH is transmitted may be transmitted through the DL CC #(j % A) from among the DL CC #0 to the DL CC #(A-1).

If the number of DL CCs on which the DL grant PDCCH or the UL grant PDCCH can be transmitted is A, any one of the DL CCs may be represented by a DL CC #k (any one of k=0, 1 to A-1). The DL CC #k and at least one of DL CCs on which the scheduling PDCCH (i.e., the DL grant PDCCH or the UL grant PDCCH) is not transmitted may be grouped.

A method of being added to the grouping method or of designating a DL CC on which a UL grant PDCCH for PUSCH transmission on a UL CC is separately transmitted may be taken into consideration.

As a first example, the UL grant PDCCH for the PUSCH transmission on the UL CC linked to the DL CCs grouped with the DL CC #k may be transmitted on the DL CC #k without separately setting up a relationship between the DL CC #k and the UL CC on which the PUSCH can be transmitted or grouping the DL CC #k and the UL CC on which the PUSCH can be transmitted.

As a second example, a relationship between the DL CC #k and the UL CC on which the PUSCH can be transmitted or grouping the DL CC #k and the UL CC on which the PUSCH can be transmitted may be separately performed. For example, it is assumed that a link between a DL CC #k and a UL CC #h is basically set up and the remaining UL CCs are not linked to a DL CC on which a UL grant PDCCH is transmitted. In this case, if UL CCs not linked to the DL CC on which the UL grant PDCCH is transmitted are grouped (including the UL CC #h) and the PUSCH has to be transmitted through a UL CC belonging to this group, a UL grant PDCCH therefor may be transmitted to UE through the DL CC #k.

In the first example and the second example, the DL CC which is included in the DL CC group or on which a scheduling PDCCH linked to the UL CC group is transmitted is assumed to be one, but not limited thereto. In order to handle a special reason (e.g., to balance a PDCCH load), a plurality of DL CCs on which the scheduling PDCCH is transmitted may be included in the DL CC group or may be associated with the UL CC group.

In a second embodiment, there is proposed a method of setting a relationship between a DL CC on which a scheduling PDCCH is transmitted and a DL CC on which a PDSCH is transmitted (or a UL CC on which a PUSCH is transmitted) based on explicit signaling.

If cross-carrier scheduling is applied to specific UE (or a relay), UE may be informed of all pieces of information about a DL CC on which a DL grant PDCCH for PDSCH transmission on a specific DL CC and/or a UL grant PDCCH for PUSCH transmission on a specific UL CC is transmitted (i.e., a DL CC on which a scheduling PDCCH is transmitted) through RRC signaling or L1/L2 control signal signaling in a UE-specific, cell-specific, or relay-specific way.

If the number of scheduling carriers (DL CCs) on which a scheduling PDCCH (i.e., a DL grant PDCCH and/or a UL grant PDCCH) can be transmitted is set to A, the DL CCs (i.e., the scheduling carriers) may have logical indices ranging from #0 to #(A-1). A specific one of the scheduling carriers is indicated by a DL CC #k (any one of k=0, 1, . . . , (A-1)). Here, at least one DL CC, from among DL CCs on which the scheduling PDCCH is not transmitted, and the DL CC #k may be grouped into one group. A method of being added to the grouping method or of separately designating a DL CC on which a UL grant PDCCH for PUSCH transmission on a UL CC is transmitted may be taken into consideration. A grouping scheme (i.e., a scheme configured by a cell, a BS, or a relay or applied to DL CCs and/or UL CCs configured in specific UE) may be configured in a higher layer in a UE-specific, cell-specific, or relay-specific way, and one or more UEs may be informed of information about the configuration through RRC signaling or L1/L2 PDCCH control signal signaling. A detailed grouping method is described below.

As a first example, definition may be given so that a UL grant PDCCH for PUSCH transmission on a UL CC linked to DL CCs grouped with the DL CC #k is transmitted in the DL CC #k, without setting up a relationship between the DL CC #k and a UL CC on which a PUSCH can be transmitted or grouping the DL CC #k and the UL CC on which the PUSCH can be transmitted may not be separately performed. Grouping the DL CC #k and the DL CCs on which the scheduling PDCCH is not transmitted may be set in a higher layer and signalized through RRC signaling or L1/L2 PDCCH control information in a UE or cell-specific way. As a second example, setting up a relationship between the DL CC #k and the UL CC on which the PUSCH can be transmitted or grouping the DL CC #k and the UL CC on which the PUSCH can be transmitted may be separately performed. For example, it is assumed that a link between a DL CC #k and a UL CC #h is basically set up and the remaining UL CCs are not linked to a DL CC on which a UL grant PDCCH is transmitted. In this case, if UL CCs not linked to the DL CC on which the UL grant PDCCH is transmitted are grouped (including the UL CC #h) and the PUSCH has to be transmitted through a UL CC belonging to this group, a UL grant PDCCH therefor may be transmitted to UE through the DL CC #k. Grouping the DL CC and/or the UL CCs may be set in a higher layer and signalized through RRC signaling or L1/L2 PDCCH control information in a UE or cell-specific way.

In the first example and the second example, the DL CC which is included in the DL CC group or on which a scheduling PDCCH linked to the UL CC group is transmitted is assumed to be one, but not limited thereto. In order to handle a special reason (e.g., to balance a PDCCH load), a plurality of DL CCs on which the scheduling PDCCH is transmitted may be included in the DL CC group or may be associated with the UL CC group.

5. Scheme for Applying CIF when Cross-Carrier Scheduling is Applied

In the state in which cross-carrier scheduling is applied and a plurality of DL CCs (i.e., scheduling DL CCs) on which a scheduling PDCCH is transmitted is configured, UE performs blind decoding on the plurality of DL CCs. In this case, the operation of the UE may be changed depending on whether a CIF is included in the scheduling PDCCH of each scheduling DL CC.

In a first embodiment, if cross-carrier scheduling is applied, a BS may include a CIF in the scheduling PDCCH of all scheduling DL CCs and transmit the scheduling PDCCH. UE performs blind decoding on the assumption that a CIF is included in all the scheduling DL CCs when performing blind decoding on all the scheduling DL CCs on which the scheduling PDCCH is transmitted. That is, a transmission station (a cell, a BS, or a relay) includes the CIF in all the scheduling PDCCHs irrespective of whether cross-carrier scheduling is applied to only the PDCCHs of some DL CCs and transmits the scheduling PDCCHs. A reception station (UE or a relay) premises that the CIF is included in all the DL CCs on which the scheduling PDCCH is monitored through blind decoding and the bit size of the CIF has been determined using the above-described method.

In a second embodiment, if cross-carrier scheduling is applied, a BS may include a CIF in PDCCHs on some of all the DL CCs on which the PDCCHs can be transmitted in some PDCCHs and transmit the PDCCHs. In a DL CC on which a PDCCH to which cross-carrier scheduling is applied is transmitted, the CIF may be included in a scheduling PDCCH, and the scheduling PDCCH may be transmitted. In a DL CC on which a PDCCH to which cross-carrier scheduling is applied is not transmitted, the CIF may not be included in the scheduling PDCCH, and the scheduling PDCCH may be transmitted.

UE may know whether cross-carrier scheduling is applied and a link relationship between a DL CC on which a PDSCH is transmitted (or a UL CC on which a PUSCH is transmitted) and a DL CC on which a scheduling PDCCH is transmitted according to the explicit or implicit signaling method. When performing blind decoding on the scheduling PDCCH in all the DL CCs on which the PDCCH is monitored through blind decoding, the UE may premise that a CIF having the above-described bit size is included in all the PDCCH candidates of a specific DL CC to which cross-carrier scheduling is applied. The UE may premise that the CIF is not included in all the PDCCH candidates on a DL CC in which PDCCH transmission for cross-carrier scheduling is not defined.

When a BS transmits a scheduling PDCCH to UE through a specific DL CC, the BS configures a DCI payload to which a CIF is not applied in a scheduling PDCCH for a PDSCH transmitted on the DL CC or a PUSCH transmitted on a UL CC linked to the DL CC. In this situation, when performing blind decoding on the scheduling PDCCH, the UE performs demodulation and decoding on CCEs in a relevant PDCCH search space on the assumption that the CIF is not included in the DCI payload.

If the number of a DL CC (i.e., it may be called a PDCCH monitoring set, an anchor DL CC, or a primary DL CC) on which a PDCCH can be transmitted is set to 1 within a UE-specific UE DL CC set, definition may be given that cross-carrier scheduling is not applied to PDSCH transmission on the DL CC on which the PDCCH is transmitted. Furthermore, definition may be given that PUSCH transmission on a UL CC basically linked to the DL CC on which the PDCCH is transmitted (i.e., a link set up in a reception station (UE or a relay)-specific or transmission station (cell, a BS, or a relay)-specific way) is PDCCH/PUSCH transmission to which cross-carrier scheduling is not applied. That is, from a viewpoint of UE or a cell, PDSCH/PUSCH transmission to which cross-carrier scheduling is applied and PDSCH/PUSCH transmission to which cross-carrier scheduling is not applied may be separately defined. In this case, a CIF may be included in the DCI format of a DL grant PDCCH or a UL grant PDCCH to which cross-carrier scheduling is applied, and a CIF may not be included in the DCI format of a DL grant PDCCH or a UL grant PDCCH to which cross-carrier scheduling is not applied.

If an overhead increase becomes a load when blind decoding is performed owing to a difference in the DCI format, a CIF may be defined as information about the DCI format or as additional L1/L2 control information and additional encoding different from control information on another DCI format may be applied in order to solve the overhead increase. Information separately encoded from the DCI format may be represented by a cross-carrier scheduling indicator for a PDCCH.

In order not to increase the total number of bits of a PDCCH, whether cross-carrier scheduling is applied may be implicitly represented by using a method of differently applying a scramble code. Whether cross-carrier scheduling is applied may be performed on the encoded bits of a DCI or may be performed using a method of making different an RNTI masked to CRC or additionally masking the CRC with a scramble code to before the DCI is encoded. Alternatively, when the DCI is modulated, whether cross-carrier scheduling is applied may be performed by assigning a different phase offset on a signal constellation (this is the same as that scrambling is performed using a phase offset code for a modulation symbol). The above-described methods may be likewise applied to a case in which the number of DL CCs on which a PDCCH can be transmitted is plural within a UE DL CC set. Here, PDCCH/PDSCH transmission and/or PDCCH/PUSCH transmission to which cross-carrier scheduling is not applied may be defined to be one or more times (this may be the same as the number of DL CCs on which a PDCCH is transmitted in case of DL PDSCH transmission).

6. Detailed Method of Transmitting CIF on PDCCH

A method of defining a CIF in a scheduling PDCCH (a DL grant PDCCH and/or a UL grant PDCCH) and transmitting the scheduling PDCCH is described in detail below.

In a first embodiment, a CIF having the above-described CIF bit size may be explicitly included on the payload of the DCI format of a DL grant PDCCH or of the DCI format of a UL grant PDCCH according to a specific transmission mode as an additional different field. The size of the field may be determined depending on the bit size of the CIF. Furthermore, the size of the field may be varied every subframe in the time domain according to a carrier configuration condition or whether specific technology or configuration scheme has been applied.

In a second embodiment, a CIF having the above-described CIF bit size may be explicitly encoded by using a different encoding method from that of control information about a DL grant PDCCH or a UL grant PDCCH. Furthermore, the DCI format of a scheduling PDCCH may be configured using encoded bits or a modulation symbol level modulated using an additional modulation scheme according to circumstances. Furthermore, additional CRC bits as a code for error detection may be added to a CIF to which additional encoding and/or modulation scheme are applied as a parity check code. Accordingly, UE can optimize PDSCH decoding latency before the DCI format of a scheduling PDCCH is decoded because the UE can know the CIF in advance.

In a third embodiment, a CIF may be implicitly included in the DCI format of a scheduling PDCCH or an encoding/modulation scheme without introducing an additional process. In other words, the CIF may be represented by using an implicit method without separately defining the field in the payload on the DCI format or designating an additional modulation symbol or additional encoded bits. For example, the state of information indicated by the CIF may be identified by a masked C-RNTI. Alternatively, the state of bits of some fields already defined in a DCI format on a scheduling PDCCH may be used to indicate information indicated by the CIF. The methods can maintain backward compatibility because they do not change the payload of the DCI format.

The above-described embodiments may be applied in combination. At least one of the three embodiments may be applied to the state of the information indicated by the CIF or some of bits of the CIF.

7. Transmission of Control Format Indicator (CFI) on PDCCH

If cross-carrier scheduling is applied to a reception station (UE or a relay), a CFI may be transmitted for a DL CC configured by or DL CCs allocated in a reception station-specific way by a transmission station (a cell, a BS, or a relay) according to a method to be described later.

Figure 17:
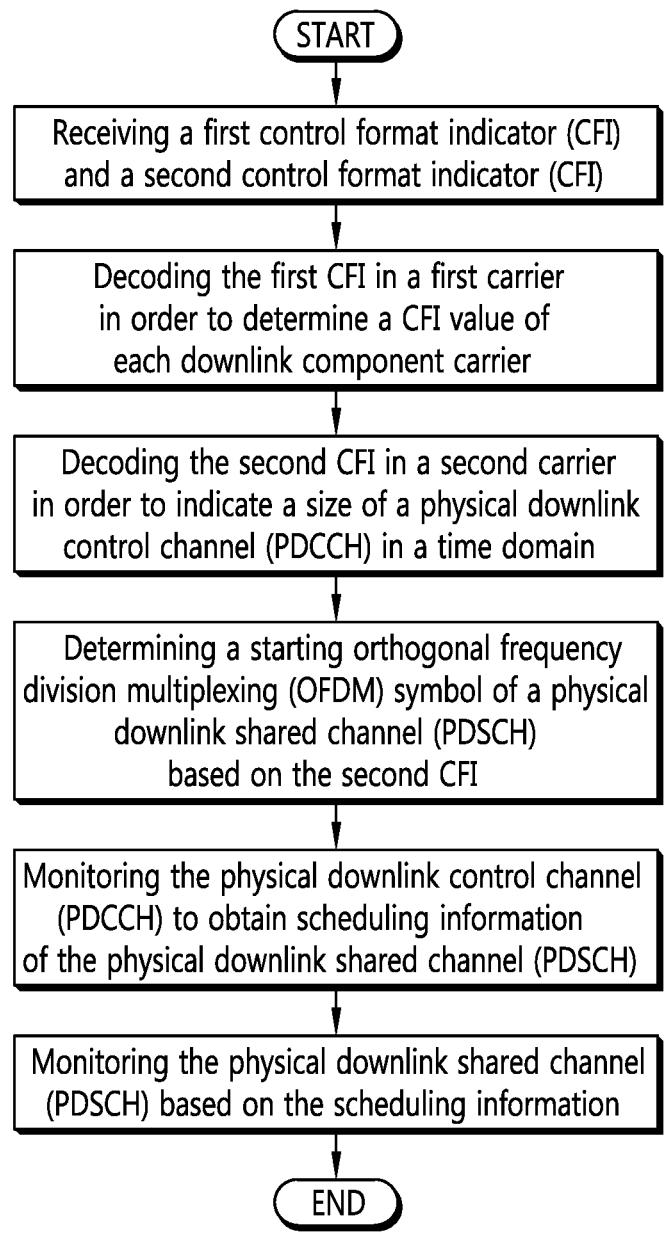
FIG. 17 is a flow chart showing a process according to an embodiment.

FIG. 17 is a flow chart showing a process according to an embodiment.The CFI may indicate the size of a control region in which a scheduling PDCCH is transmitted when PDSCH transmission according to a CIF is scheduled. Alternatively, the CFI may indicate the number of OFDM symbols (or indices) right before an OFDM symbol at which a data region in which a PDSCH is transmitted is started. If the index of the OFDM symbol at which the data region is started is i, the CFI may indicated the index i-1 of an OFDM symbol.

First, a case in which a common CFI value is set in DL CCs is taken into consideration. That is, the case corresponds to a case in which the number of OFDM symbols (or the size of the control region) on which a PDCCH can be transmitted is the same in the DL CCs.

UE has only to first decode a PCFICH through which the CFI is transmitted in a specific DL CC on which PDCCH blind decoding has to be performed. That is, if the PCFICH is decoded in a specific DL CC irrespective of whether cross-carrier scheduling is applied because the CFI value is the same in all the DL CCs, the number of OFDM symbols on which the PDCCH of the DL CC is transmitted can be known.

Accordingly, from a viewpoint of a BS, it is not necessary to separately define a field for transmitting a CFI value in the DCI format of a PDCCH exclusively used for cross-carrier scheduling or a PDCCH transferred to a reception station.

Next, a case in which the CFI is independently set every DL CC is taken into consideration.

In order to know the CFI value of each DL CC, UE first decodes a CFI (it is called a first CFI) on a PCFICH in the DL CC on which a PDCCH to be subject to blind decoding is transmitted. Furthermore, the UE needs to additionally obtain the CFI (it is called a second CFI) of a DL CC for a PDSCH to which cross-carrier scheduling is applied. This is because the size of the control region of another DL CC must be known in order to decode a PDSCH transmitted on another DL CC to which cross-carrier scheduling is applied. The following methods are possible in order to obtain the second CFI.

In a first embodiment, a BS may transmit a PCFICH on all DL CCs in the first OFDM symbol of a subframe irrespective of whether cross-carrier scheduling is applied. For example, it is assumed that a scheduling PDCCH is transmitted on a DL CC #1 and a DL CC #2 is indicated in the DL grant PDCCH of the DL CC #1. In this case, UE may know the size of the control region of the DL CC #1 through a first CFI on the PCFICH of the DL CC #1. Furthermore, the UE may know the size of the control region of the DL CC #2 through a second CFI on the PCFICH of the DL CC #2.

The UE that has received a PDCCH applied to cross scheduling checks the size of the control region through the PCFICH of the DL CC before decoding the PDSCH in the DL CC indicated by a CIF.

In a second embodiment, the CFI of a DL CCL on which a PDSCH is transmitted may be informed on a scheduling PDCCH of a DL CC to which cross-carrier scheduling is applied. In this case, UE does not need to first receive a PCFICH on the DL CC on which the PDSCH is transmitted. A BS may include a field, informing the second CFI for the DL CC on which the PDSCH is transmitted, in a DCI on the scheduling PDCCH in a UE/cell-specific way.

The field, informing the second CFI for the DL CC on which the PDSCH is transmitted, may be included in the DCIs of all DL grant PDCCHs regarding only UE to which cross-carrier scheduling is applied. The UE to which cross-carrier scheduling is applied may know the second CFI through blind decoding.

The field, informing the second CFI for the DL CC on which the PDSCH is transmitted, may be included in DCIs for only DL grant PDCCHs to which cross-carrier scheduling is applied regarding UE to which cross-carrier scheduling is applied. The UE to which cross-carrier scheduling is applied may know the second CFI through blind decoding.

A DCI format, including the field informing the second CFI for the DL CC on which the PDSCH is transmitted, may be applied to only a DL grant PDCCH and may also be applied to a UL grant PDCCH according to circumstances. Here, the second CFI may be included in a DCI on the UL grant PDCCH irrespective of which cross-carrier scheduling is applied.

Independently from the method, a field, indicating the value of an uplink cell ID having a meaning of a physical cell ID or a logical cell ID (i.e., a criterion) associated with an uplink PUCCH or PUSCH transmission configuration, etc. may be included in a DCI.

In a third embodiment, a dedicated physical control channel or a DCI format indicating a CFI may be separately defined. For only all DL CCs configured to transmit a PDCCH or a DL CC (i.e., a primary DL CC or an anchor DL CC) according to a specific criterion irrespective of whether cross-carrier scheduling is applied to DL CCs configured by a BS, all CFIs configured by the BS may be transmitted through a fixed CCE position in a PDCCH transmission region (on a cell common search space or a UE-specific search space) on the relevant DL CC or through a specific varying CCE column in a common search space.

The dedicated physical control channel may have a common PDCCH form defined through the encoding and modulation of 3GPP LTE and may have a scheme defined through encoding and modulation different from a conventional PDCCH, such as the PCFICH or the PHICH of 3GPP LTE release 8.

In a fourth embodiment, a BS may inform a CFI for one or more DL CCs through signaling in a UE/cell-specific way. CFIs for all DL CCs supported by a BS, CFIs for DL CCs supporting cross-carrier scheduling, or CFIs for DL CCs supported by UE may be informed. This information may be transmitted through an RRC message, a MAC message, or L1/L2 PDCCH control signaling.

In order to supplement the occurrence of a CFI reception error, the first to fourth embodiments may be combined and used or two or more specific embodiments may be mixed and used.

Furthermore, the embodiments may be applied or changed according to channel conditions of UEs. One of the first to fourth embodiments is basically used and, if a decoding success of a PCFICH on a DL CC on which a PDSCH is transmitted is guaranteed to a certain level, a second CFI may be determined based on only the PCFICH. A BS may inform UE whether only the PCFICH will be applied or whether at least one of the first to fourth embodiments will be applied through RRC signaling, MAC signaling, or a PDCCH.

The method of transmitting a CFI on a PDCCH may also be applied to a case in which a meaning of the CFI is different from that of the above examples.

First, the method of transmitting a CFI on a PDCCH may also be applied to a case in which the meaning of the CFI is common control information on a DL CC, as in the case in which the meaning of the CFI indicates the number of OFDM symbols capable of transmitting the PDCCH on the DL CC and also has information (e.g., information indicating a PHICH period in a DL CC) common to other reception stations or PDCCH configuration information specific to a reception station.

Second, the method of transmitting a CFI on a PDCCH may also be applied to a case in which the meaning of the CFI is unique control information according to each DL CC, as in the case in which the meaning of the CFI indicates the number of OFDM symbols capable of transmitting the PDCCH on the DL CC and also has PDCCH configuration information having a meaning unique to a specific reception station.

8. Meaning of DL-UL CC Linkage Configuration

The DL-UL CC linkage may be defined according to the configuration of a DL CC and a UL CC configured by a transmission station, the transmission band/reception band separation of a system already defined on the IMT band, and parameters set in a higher layer and signaled to a reception station (UE or a relay), irrespective of whether cross-carrier scheduling is applied.

A cell/BS-specific DL-UL CC linkage may be set up according to a condition that a DL CC and a UL CC are configured in a transmission station and the transmission band/reception band separation of a system already defined on the IMT band.

A UE-specific DL-UL CC linkage may be set up implicitly or explicitly. More particularly, the linkage is set up according to an implicit relation on a UE DL CC set and/or a UE UL CC set configured in a UE-specific way or control information explicitly signaled from a base station. Alternatively, part of the linkage set up in a cell-specific way may be used as a DL-UL CC linkage set up in a UE-specific way.

9. Configuration of CC on which Physical Channel Associated with DL-UL CC Linkage is Transmitted The physical channel of a DL CC and the physical channel of a UL CC may be configured based on a cell/UE-specific DL-UL CC linkage.

A UL CC on which an uplink ACK/NACK for a PDSCH transmitted on a specific DL CC is transmitted may be configured as a UL CC linked to a DL CC on which the PDSCH or a DL grant PDCCH for the PDSCH is transmitted.

Alternatively, a DL CC on which a downlink ACK/NACK for a PUSCH transmitted through a specific UL CC is transmitted may be configured as a DL CC linked to a UL CC on which the PUSCH is transmitted or a DL CC on which a UL grant PDCCH for the PUSCH is transmitted.

The above-described method may be applied between a PDCCH and a PDSCH or a PDCCH and a PUSCH based on a CIF and may be used in both cases in which cross-carrier scheduling is applied and not applied.

If cross-carrier scheduling is applied, a UL CC on which an uplink ACK/NACK for a PDSCH transmitted on a specific DL CC is transmitted for UE to which a carrier aggregation is applied may be configured according to the following methods.

In a first embodiment, a UL CC on which an uplink ACK/NACK for a PDSCH transmitted on a specific DL CC is transmitted may be configured as a UL CC linked to the DL CC on which the PDSCH is transmitted.

In a second embodiment, a UL CC on which an uplink ACK/NACK for a PDSCH transmitted on a specific DL CC (a PDCCH according to circumstances) is transmitted may be configured as a UL CC linked to a DL CC on which a DL grant PDCCH for the PDSCH is transmitted.

The DL-UL CC linkage may be cell/BS-specific or UE-specific. In the second embodiment, if cross-carrier scheduling is applied, in order to transmit a DL grant PDCCH in response to the transmission of a PDSCH on one or more DL CCs, an uplink ACK/NACK may be transmitted through a UL CC linked to a DL CC configured in a UE/cell-specific way. In this case, the UL CC on which the uplink ACK/NACK is transmitted may be considered as a UL anchor CC or a UL primary CC.

A DL CC on which a downlink ACK/NACK (i.e., a PHICH) for a PUSCH transmitted on a specific UL CC is transmitted may be configured according to the following methods.

In a first embodiment, a DL CC on which a downlink ACK/NACK (i.e., a PHICH) for a PUSCH transmitted on a specific UL CC may be configured as a DL CC linked to the UL CC on which the PUSCH is transmitted.

In a second embodiment, a DL CC on which a downlink ACK/NACK (i.e., a PHICH) for a PUSCH transmitted on a specific UL CC may be configured as a DL CC on which a UL grant PDCCH for the PUSCH is transmitted.

The DL-UL CC linkage may be cell/BS-specific or UE-specific. In the second embodiment, if cross-carrier scheduling is applied, in order to transmit a UL grant PDCCH for PUSCH transmission on one or more UL CCs, a precondition is that a downlink ACK/NACK (i.e., a PHICH) is transmitted through a DL CC configured in a UE/cell-specific way. If a DL CC on which a DL grant PDCCH and a UL grant PDCCH are transmitted is identically configured, the DL CC may be considered as a DL anchor CC or a DL primary CC. Alternatively, the characteristic of the relevant DL CC may be defined to cover the transmission of the downlink ACK/NACK on the DL CC considered as the DL anchor CC or the DL primary CC according to circumstances.

10. Configuration of DL Extended CC Based on Cross-Carrier Scheduling and CIF

Carriers may be classified into specific carrier types according to a DL-UL CC linkage, the configuration of a physical control channel transmission carrier associated with the DL-UL CC linkage, and the characteristic of cross-carrier scheduling.

If a DL CC on which a PDCCH performing cross-carrier scheduling is transmitted is configured in a cell/BS-specific way and a PHICH is also transmitted through the DL CC, a BS may characterize the remaining DL CCs other than the DL CCs on which the PDCCH and the PHICH are transmitted as extended carriers (i.e., DL extended CCs) in the state in which a plurality of DL CCs has been configured. The extended carriers need not to designate CFI values associated with PDSCH transmission because they do not transmit the PDCCH and also need not to transmit a PCFICH.

11. Configuration of UL Primary Carrier Based on Cross-Carrier Scheduling and CIF A UL CC having a specific character may be characterized implicitly or explicitly based on the configuration of a physical channel transmission carrier associated with a DL-UL CC linkage and the characteristic of cross-carrier scheduling.

For example, a method of configuring a DL CC on which a PDCCH performing cross-carrier scheduling is transmitted in a transmission station-specific way or a reception station-specific way or of transmitting an uplink ACK/NACK for PDSCH transmission, designated by the PDCCH, through a PUCCH or a PUSCH on a UL CC configured by a link between one or more DL CCs and DL CC/UL CCs on which the PDCCH is transmitted may be used. This UL CC may be considered as a UL anchor CC or a UL primary CC.

A scheduling request or feedback information (channel state information, etc.) may be transmitted through the UL anchor CC or the UL primary CC.

The UL anchor CC or the UL primary CC may be configured through higher layer signaling in a reception station-specific or transmission station-specific way.

12. Management and Use of PDCCH Monitoring Set

The PDCCH monitoring set is a set of at least one DL CC on which UE has to decode a PDCCH (i.e., a scheduling PDCCH). The UE may use the PDCCH monitoring set to determine whether cross-carrier scheduling is applied and to decode or analogize relevant parameters.

Figure 15:
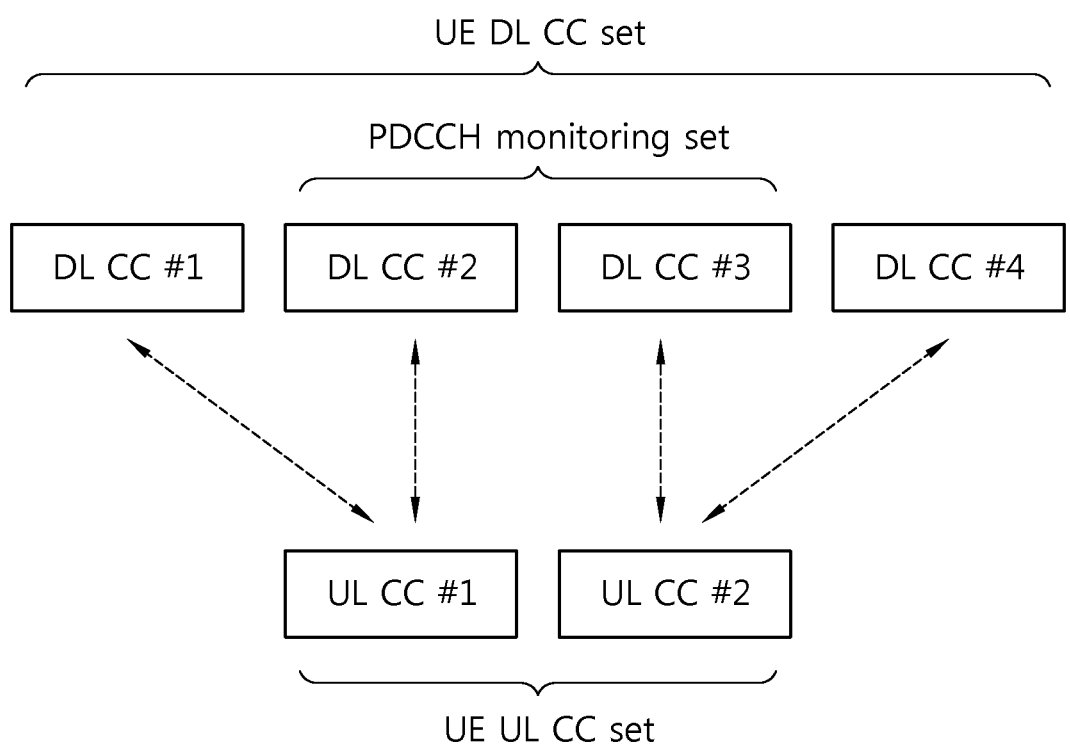
FIG. 15 shows an example of a CC set.

FIG. 15 shows an example of a CC set. It is assumed that a UE DL CC set of 4 DL CCs DL CC #1, #2, #3, and #4, a UE UL CC set of 2 UL CCs UL CC #1 and #2, and a PDCCH monitoring set of 2 DL CCs DL CC #2 and #3 are allocated to UE. The UE DL CC set is a set of DL CCs scheduled for the UE to receive a PDSCH, and the UE UL CC set is a set of UL CCs scheduled for the UE to transmit a PUSCH.

The PDCCH monitoring set may be explicitly defined as RRC parameters and signalized. A transmission station (a cell, a BS, or a relay) may be signalized in a reception station (UE or a relay)-specific way or signalized in a cell-specific way. Alternatively, the PDCCH monitoring set may be transmitted through L1/L2 PDCCH control signaling. Alternatively, the PDCCH monitoring set may be implicitly configured as a combination of two or more of RRC parameters. For example, the PDCCH monitoring set may be represented by a combination of a UE DL CC set allocated to UE and indices of carriers on which the PDCCH is transmitted within the set or a combination of a UL DL CC set and indices of one or more DL CCs on which the PDCCH is not transmitted in a UE-specific way within the set.

The PDCCH monitoring set may be divided into and separately defined as 1) a set (i.e., a DL PDCCH monitoring set) indicating DL CCs on which PDCCHs related to the transmission of a PDSCH (it may be limited to a UE-specific PDSCH) are transmitted and 2) a set (i.e., a UL PDCCH monitoring set) indicating DL CCs on which PDCCHs related to the transmission of a UE-specific PUSCH are transmitted. In this case, the configuration of a CIF (e.g., the bit size of the CIF) for the PDSCH transmission is set based on a relationship with the PDCCH monitoring set of 1), and the configuration of a CIF for the PUSCH transmission is set based on a relationship with the PDCCH monitoring set of 2).

This is described in detail below.

(1) When the Number of DL CCs within the PDCCH Monitoring Set is 1:

If the number of DL CCs (i.e., a UE DL CC set) available for UE is Nd (>1), but 1 DL CC exists in the PDCCH monitoring set, scheduling information about the remaining DL CCs other than the DL CC designated by the PDCCH monitoring set is decoded through the DL CC designated by the PDCCH monitoring set.

The bit size of a CIF indicating each DL CC may be determined by the Nd. For example, the bit size of the CIF may be ceil ($\log_2 Nd$) bits. Alternatively, a state capable of indicating the Nd is implicitly interpreted and mapped to a decoded PDCCH codeword.

The DL CC existing in the PDCCH monitoring set may be defined to designate only scheduling information about other DL CCs. Alternatively, the DL CC existing in the PDCCH monitoring set may be defined to designate scheduling information about Nu UL CCs. Alternatively, scheduling information about all DL CCs/UL CCs may be designated. If the DL CC existing in the PDCCH monitoring set indicates scheduling information about UL CCs, an Nu value may be used as the value of a carrier indicator without change, and the Nu value may be converted into ceil ($\log_2 Nu$) and represented by bits. Alternatively, scheduling information indicated in each PDCCH may be interpreted through implicit mapping indicating an Nu state.

(2) When the Number of DL CCs within the PDCCH Monitoring Set is Two or more:

Information about whether cross-carrier scheduling will be permitted between the DL CCs within the PDCCH monitoring set may be included in addition to factors defined when the number of DL CCs within the PDCCH monitoring set is 1.

If cross-carrier scheduling is permitted between the DL CCs within the PDCCH monitoring set, UE may be operated as in the case in which the size of the PDCCH monitoring set is 1 according to the number of DL CCs (i.e., Nd in number, which may include the PDCCH monitoring set or part of the PDCCH monitoring set or may not include the PDCCH monitoring set) on which a PDSCH can be received. Meanwhile, if cross-carrier scheduling is not permitted between the DL CCs existing in the PDCCH monitoring set, the following methods may be applied.

If the DL PDCCH monitoring set and the UL PDCCH monitoring set simultaneously exist in the PDCCH monitoring set, a specific number of DL CCs within a predetermined rule (e.g., the PDCCH monitoring set) may be a subset for UL CCs, the remaining DL CCs may be defined as a subset for the DL CCs, and the number of DL CCs may be defined to be included in the PDCCH monitoring set.

Here, methods of using a CIF regarding the DL PDCCH monitoring set/the UL PDCCH monitoring set is as follows.

A first method is to define cross-carrier scheduling by sub-grouping (or pairing) a specific number of DL CCs or UL CCs in decoding a PDCCH for the DL CCs within the PDCCH monitoring set, if the DL PDCCH monitoring set and the UL PDCCH monitoring set are not distinguished from each other within the PDCCH monitoring set.

The sub-grouping method may be defined in such a manner that a specific DL CC is independently operated and specific DL CC groups permit cross-carrier scheduling. The specific DL CC may be a DL CC used to obtain system information or may be a reliable DL CC with good reception sensitivity.

A second method is to equally divide DL CCs on which a PDSCH must be received into the DL CCs of the PDCCH monitoring set and to map the divided DL CCs. Here, the number of bits that must indicate all carriers may be configured to be a minimum. For example, if the DL CCs on which the PDSCH must be received have been equally divided, the number of bits that must indicate carriers may be equally divided in the form of an exponential multiplication of 2. If the DL CCs on which the PDSCH must be received are not equally divided or not represented in the form of an exponent of 2, the DL CCs may not be equally divided and then divided according to another value in which the number of bits that must indicate carriers may be represented by an exponential multiplication of 2 after the DL CCs are divided. For example, if an eighth DL CC is to be divided into 3 PDCCH monitoring sets, the 3 PDCCH monitoring sets may be grouped into [2, 2, 4]. In this case, cross-carrier scheduling may be performed according to the number of bits that becomes an exponential multiplication of 2. Likewise, the UL CCs may be sub-grouped.

Alternatively, different sub-grouping may be applied to DL CCs and UL CCs. For example, if UE is configured to use different numbers of DL CCs and UL CCs, the DL CCs may be sub-grouped, but the UL CCs may be treated as one without being sub-grouped. In this state, a PDCCH codeword may be transmitted in the carriers of all PDCCH monitoring sets or all the PDCCH monitoring sets may be divided into subsets, and a UL PDCCH may be transmitted only in the carriers of the subset (the size of the subset may be 1 or more).

If the PDCCH monitoring set is defined, information about a UL CC may be additionally estimated. A DL CC may be informed through explicit signaling, but the UL CC may be implicitly estimated. In this case, UE may estimate an available UL CC from the PDCCH monitoring set. That is, in this method, the UE may use only UL CCs having a cell-specific DL CC/UL CC link relationship set up with the DL CC of the PDCCH monitoring set when the UE defines UL CCs to be used because the cell-specific DL CC/UL CC link relationship has been set up. According to this method, a UL grant for the UL CCs may be individually transmitted for every UL CC in a carrier connected to the DL CC of each DL PDCCH monitoring set. Alternatively, the UL grant for the UL CCs may be transferred by configuring a subset formed of one or more of the DL CCs of the PDCCH monitoring set. Here, a DL CC through which the relevant UL grant is transmitted may be explicitly defined within the PDCCH monitoring set and informed. Alternatively, the DL CC through which the relevant UL grant is transmitted may be implicitly defined within the PDCCH monitoring set. For example, the DL CC through which the relevant UL grant is transmitted may be defined according to a specific criterion, such as that a carrier having the lowest index, a carrier having the highest index, a primary carrier, or an anchor carrier is selected as a carrier indicated in a system band.

In the PDCCH monitoring set, a scheme for configuring one set to be a valid structure for one UE and a scheme for configuring two or more sets to be valid for one UE may be taken into consideration. The configuration valid for only one set is a scheme for transmitting a PDCCH monitoring set if an operation is to be redefined when UE employs a carrier aggregation. Meanwhile, the scheme for configuring two or more PDCCH monitoring sets to be valid may be used when information about a previous PDCCH monitoring set is to be updated or an operation for each carrier is to be controlled by a combination of different PDCCH monitoring sets.

The PDCCH monitoring set may be separately used according to a case in which the PDCCH monitoring set is derived from cell-specific carrier sets according to its characteristic or a case in which the PDCCH monitoring set is formed of only a UE-specific carrier set irrespective of the characteristic. If the PDCCH monitoring set is defined as cell-specific carrier sets, it may include one or more specific carriers when the carriers are allocated to UE in such a manner that DL CCs to be used for cross-carrier scheduling are previously defined in a system (here, DL CC/UL CCs may be separately defined) and the UE is not explicitly informed. In this case, the UE searches the cell-specific PDCCH monitoring set for a PDCCH monitoring carrier to be used. In this case, cross-carrier scheduling may be immediately activated in a carrier activation step or may be used according to a method of explicitly informing whether cross-carrier scheduling will be activated.

Figure 16:
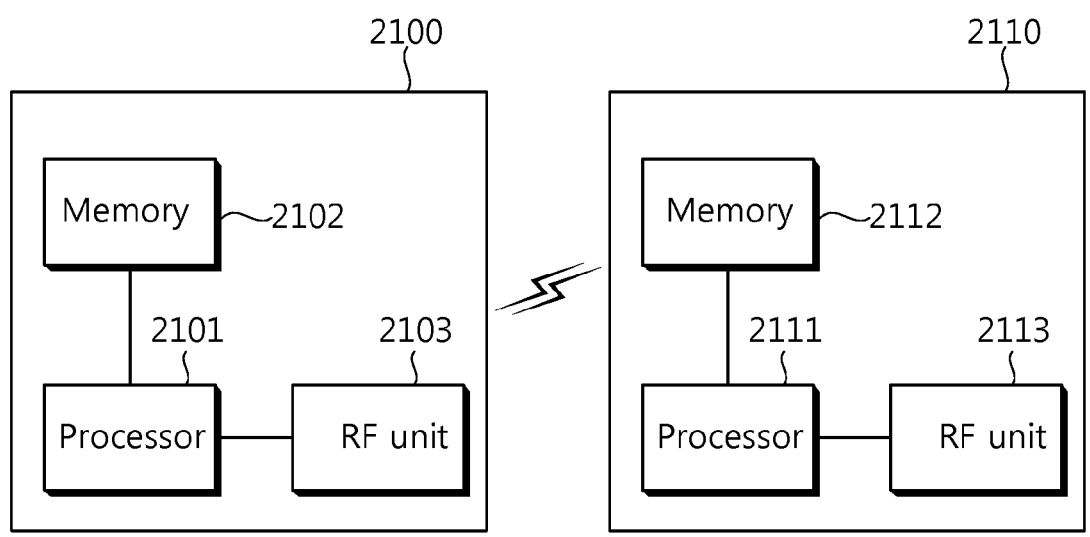
FIG. 16 is a block diagram showing a wireless communication system in which the embodiments of the present invention are implemented.

FIG. 16 is a block diagram showing a wireless communication system in which the embodiments of the present invention are implemented.

The BS 100 includes a processor 110, memory 120, and a Radio Frequency (RF) unit 130.

The processor 110 implements the proposed functions, processes and/or methods. In the above-described embodiments, the operations of the BS may be implemented by the processor 110. The processor 110 may transmit information, indicating whether cross-carrier scheduling is performed, through a higher layer signal or L1/L2 PDCCH control signaling. Furthermore, the processor 110 may perform cross-carrier scheduling. The memory 120 is connected to the processor 110, and it stores protocols or parameters for a multi-carrier operation. The RF unit 130 is connected to the processor 110, and it transmits and/or receives radio signals.

The UE 200 includes a processor 210, memory 220, and an RF unit 230.

The processor 210 implements the proposed functions, processes and/or methods. In the above-described embodiments, the operations of the UE may be implemented by the processor 210. The processor 210 supports a multi-carrier operation, receives information, indicating whether cross-carrier scheduling is performed, from a BS, and determines whether cross-carrier scheduling is performed based on the information. Downlink data is received uplink data is transmitted according to cross-carrier scheduling. The information indicating whether cross-carrier scheduling is performed may be received through a higher layer signal.

The memory 220 is connected to the processor 210, and it stores protocols or parameters for a multi-carrier operation. The RF unit 230 is connected to the processor 210, and it transmits and/or receives radio signals The processor 110, 210 may include Application-Specific Integrated Circuits (ASICs), other chipsets, logic circuits, and/or data processors. The memory 120, 220 may include Read-Only Memory (ROM), Random Access Memory (RAM), flash memory, memory cards, storage media and/or other storage devices. The RF unit 130, 230 may include a baseband circuit for processing a radio signal. When the above-described embodiment is implemented in software, the above-described scheme may be implemented using a module (process or function) which performs the above function. The module may be stored in the memory 120, 220 and executed by the processor 110, 210. The memory 120, 220 may be placed inside or outside the processor 110, 210 and connected to the processor 110, 210 using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method of decoding a signal for a user equipment (UE), the method comprising:
receiving, by the UE, a first control format indicator (CFI) and a second CFI from an evolved-NodeB (eNB) through a physical control format indicator channel (PCFICH);
monitoring, by the UE, a physical downlink control channel (PDCCH) that is received through a first carrier from the eNB, the PDCCH including scheduling information for a reception of a physical downlink shared channel (PDSCH); and monitoring, by the UE, the PDSCH based on the scheduling information included in the PDCCH, wherein the PDSCH is received through a second carrier from the eNB, wherein the first CFI is decoded in the first carrier to determine a CFI value of each downlink component carrier, wherein the second CFI is obtained in the second carrier to indicate a size of the PDCCH in a time domain, wherein the first CFI and the second CFI are included in a radio resource control (RRC) message, wherein a cross-carrier scheduling is applied for the first carrier and the second carrier, wherein the second CFI is obtained by a specific field, which is included in downlink control information (DCI) of all downlink grant PDCCH to which the cross-carrier scheduling is applied, wherein a starting orthogonal frequency division multiplexing (OFDM) symbol for the PDSCH in a subframe is determined based on the obtained second CFI, which indicates a number of OFDM symbols right before the starting OFDM symbol for the PDSCH, wherein, if an index of the starting OFDM symbol for the PDSCH is equal to i, the obtained second CFI indicates an index for the number of OFDM symbols as i-1, wherein each bit size of the first CFI and second CFI is determined by an equation of $\log_2 X$, where "X" is a number of downlink component carriers within a sub-group or a maximum index value of the downlink component carriers, wherein a size of the specific field that obtains the second CFI is determined by the determined bit size of the second CFI, and wherein the size of the specific field is varied for every subframe in the time domain.

2. The method of claim 1, wherein the starting OFDM symbol for the PDSCH is placed after OFDM symbols where the PDCCH is received.

3. The method of claim 1, wherein the first carrier and the second carrier have different frequencies from each other.

4. The method of claim 1, wherein the scheduling information comprises a carrier indication field (CIF) which indicates the second carrier.

5. A user equipment (UE), comprising:
a radio frequency (RF) unit configured to transmit and receive a radio signal; and
a processor connected to the RF unit, the processor being configured to:
receive a first control format indicator (CFI) and a second CFI from an evolved-NodeB (eNB);
monitor a physical downlink control channel (PDCCH) that is received through a first carrier from the eNB, the PDCCH including scheduling information for a reception of a physical downlink shared channel (PDSCH); and
monitor the PDSCH based on the scheduling information included in the PDCCH, wherein the PDSCH is received through a second carrier from the eNB, wherein the first CFI is decoded in the first carrier to determine a CFI value of each downlink component carrier, wherein the second CFI is obtained in the second carrier to indicate a size of the PDCCH in a time domain, wherein the first CFI and the second CFI are included in a radio resource control (RRC) message, wherein a cross-carrier scheduling is applied for the first carrier and the second carrier, wherein the second CFI is obtained by a specific field, which is included in downlink control information (DCI) of all downlink grant PDCCH to which the cross-carrier scheduling is applied, wherein a starting orthogonal frequency division multiplexing (OFDM) symbol for the PDSCH in a subframe is determined based on the obtained second CFI, which indicates a number of OFDM symbols right before the starting OFDM symbol for the PDSCH, wherein, if an index of the starting OFDM symbol for the PDSCH is equal to i, the obtained second CFI indicates an index for the number of OFDM symbols as i-1, wherein each bit size of the first CFI and second CFI is determined by an equation of $\log_2 X$, where "X" is a number of downlink component carriers within a sub-group or a maximum index value of the downlink component carriers, wherein a size of the specific field that obtains the second CFI is determined by the determined bit size of the second CFI, and wherein the size of the specific field is varied for every subframe in the time domain.

6. The UE of claim 5, wherein the starting OFDM symbol for the PDSCH is placed after OFDM symbols where the PDCCH is received.

7. The UE of claim 5, wherein the first carrier and the second carrier have different frequencies from each other.

8. The UE of claim 5, wherein the scheduling information comprises a carrier indication field (CIF) which indicates the second carrier.

* * * * *